(12) United States Patent
He et al.

(10) Patent No.: US 12,101,268 B2
(45) Date of Patent: Sep. 24, 2024

(54) UE CAPABILITY FOR PERFORMING SERVING CELL BASED CSI-RS RRM MEASUREMENTS

(71) Applicant: QUALCOMM Incorporated, San Diego, CA (US)

(72) Inventors: Qunfeng He, San Diego, CA (US); Arvind Vardarajan Santhanam, San Diego, CA (US); Aamod Khandekar, San Diego, CA (US); Alexei Yurievitch Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/455,194

(22) Filed: Nov. 16, 2021

(65) Prior Publication Data

US 2022/0200751 A1 Jun. 23, 2022

Related U.S. Application Data

(60) Provisional application No. 63/129,530, filed on Dec. 22, 2020, provisional application No. 63/129,497, filed on Dec. 22, 2020.

(51) Int. Cl.
*H04L 5/00* (2006.01)
*H04W 24/08* (2009.01)
*H04W 24/10* (2009.01)

(52) U.S. Cl.
CPC .......... *H04L 5/0048* (2013.01); *H04W 24/08* (2013.01); *H04W 24/10* (2013.01)

(58) Field of Classification Search
CPC ...... H04L 5/0048; H04W 24/08; H04W 24/10
See application file for complete search history.

(56) References Cited

U.S. PATENT DOCUMENTS

2019/0254110 A1   8/2019  He et al.
2021/0329512 A1*  10/2021 Jassal ............... H04W 36/0085

OTHER PUBLICATIONS

U.S. Appl. No. 63/010,398, filed Apr. 15, 2020, corresponding to Jassal et al. (US 2021/0329512 A1). (Year: 2020).*
International Search Report and Written Opinion—PCT/US2021/059719—ISA/EPO—Feb. 28, 2022.

(Continued)

*Primary Examiner* — Melvin C Marcelo
(74) *Attorney, Agent, or Firm* — Procopio, Cory, Hargreaves & Savitch LLP

(57) ABSTRACT

Apparatus, methods, and computer program products for serving cell measurement based on CSI-RS RRM are provided. An example apparatus may transmit, to a base station, an indication indicating support for reporting one or more serving cell channel state information reference signal (CSI-RS) radio resource management (RRM) measurements independent of non-serving cell CSI-RS RRM measurements. The example apparatus may receive, from the base station, a configuration of layer 3 measurement resources. The example apparatus may perform, based on the configuration of the layer 3 measurement resources, the one or more serving cell CSI-RS RRM measurements. The example apparatus may transmit, to the base station, the one or more serving cell CSI-RS RRM measurements for a serving cell.

30 Claims, 11 Drawing Sheets

(56) References Cited

OTHER PUBLICATIONS

LG Electronics Inc: "UE Measurements in SCG Deactivation", 3GPP TSG-RAN WG2 Meeting #116-e, R2-2111017, 3rd Generation Partnership Project, Mobile Competence Centre, 650, Route Des Lucioles, F-06921 Sophia-Antipolis Cedex, France vol. RAN WG2, No. Online, Nov. 1, 2021-Nov. 12, 2021, Oct. 22, 2021, 4 Pages, XP052067455.
Sony: "Reduction in RRM Measurements for UE Power Saving", 3GPP TSG RAN WG1 #96, R1-1902187, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 8 Pges, XP051599882, p. 1-p. 5.

\* cited by examiner

US 12,101,268 B2

UE CAPABILITY FOR PERFORMING SERVING CELL BASED CSI-RS RRM MEASUREMENTS

CROSS REFERENCE TO RELATED APPLICATION(S)

This application claims the benefit of and priority to U.S. Provisional Application Ser. No. 63/129,530, entitled "UE CAPABILITY FOR PERFORMING SERVING CELL BASED CSI-RS RRM MEASUREMENTS" and filed on Dec. 22, 2020, and U.S. Provisional Application Ser. No. 63/129,497, entitled "SUPPORTING SERVING CELL CSI-RS RRM MEASUREMENTS FOR MDT" and filed on Dec. 22, 2020, each of which is expressly incorporated by reference herein in its entirety.

TECHNICAL FIELD

The present disclosure relates generally to communication systems, and more particularly, to a wireless communication system with channel state information reference signal (CSI-RS) radio resource management (RRM) measurements.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The UE may transmit, to a base station, an indication indicating support for reporting one or more serving cell CSI-RS RRM measurements independent of non-serving cell CSI-RS RRM measurements. The UE may receive, from the base station, a configuration of layer 3 measurement resources. The UE may perform, based on the configuration of the layer 3 measurement resources, the one or more serving cell CSI-RS RRM measurements. The UE may transmit, to the base station, the one or more serving cell CSI-RS RRM measurements for a serving cell.

In another aspect of the disclosure, a method, a computer-readable medium, and an apparatus at a base station are provided. The base station may receive, from a UE, an indication indicating support for reporting one or more serving cell CSI-RS RRM measurements independent of non-serving cell CSI-RS RRM measurements. The base station may, responsive to receiving the indication, transmit, to the UE, a configuration of layer 3 measurement resources. The base station may receive, from the UE, the one or more serving cell CSI-RS RRM measurements for a serving cell.

In another aspect of the disclosure, a method, a computer-readable medium, and an apparatus at a UE are provided. The UE may receive, from a base station, a configuration of layer 3 measurement objects for a serving cell. The UE may perform, based on the configuration of the layer 3 measurement objects, one or more serving cell measurements of one or more layer 3 measurement reference signal resources for the serving cell. The UE may transmit, to the base station, a serving cell report of the one or more serving cell measurement reference signal resources of the layer 3 measurement objects.

In another aspect of the disclosure, a method, a computer-readable medium, and an apparatus at a base station are provided. The base station may transmit, to a UE, a configuration of layer 3 measurement objects for a serving cell. The base station may receive, from the UE, a serving cell report of one or more serving cell measurement reference signal resources of the layer 3 measurement objects.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
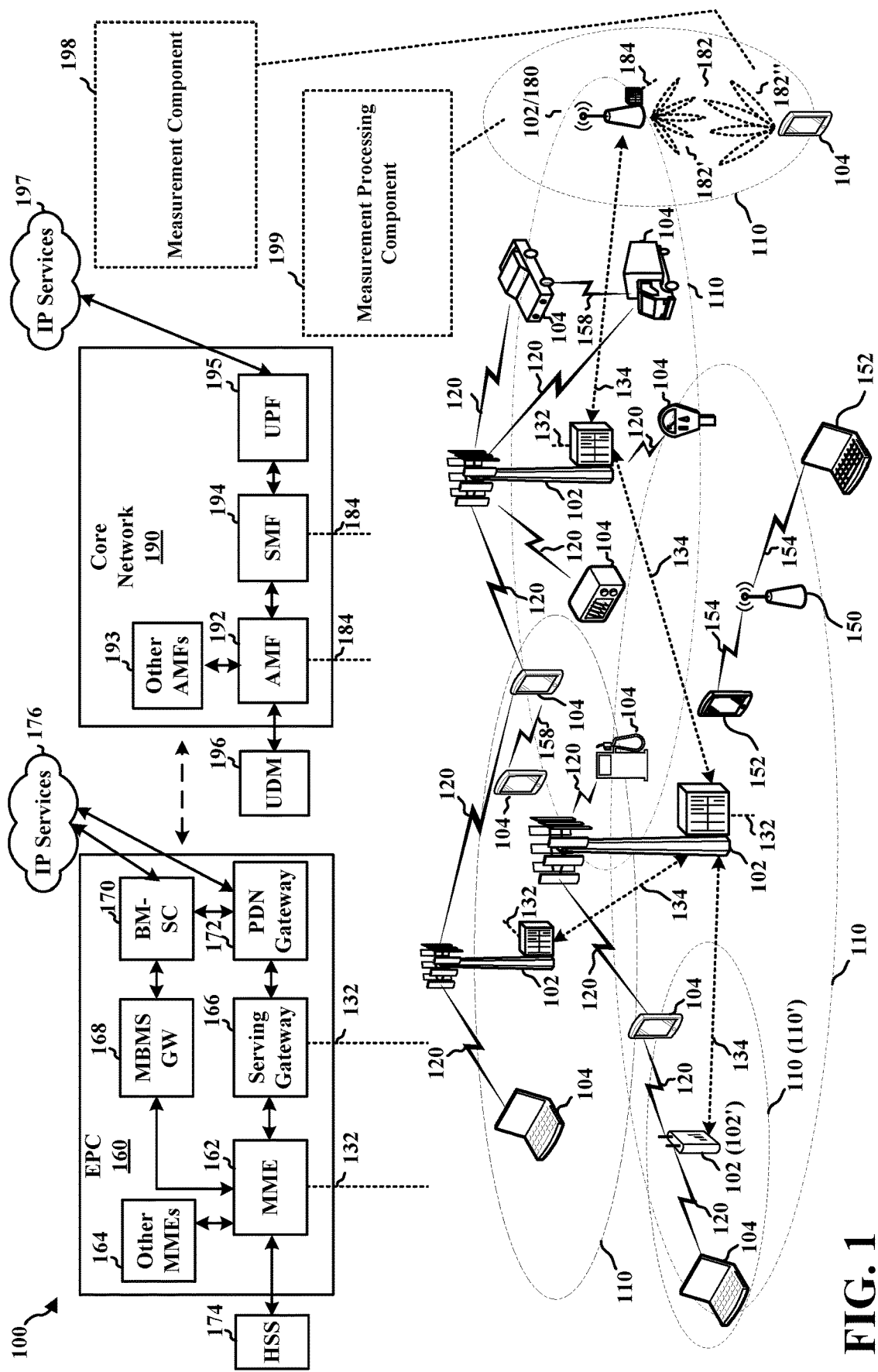
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

In some wireless communication systems, CSI-RS signals may be used for RRM/mobility control. For example, a UE may perform measurements of layer 3 CSI-RS for RRM or mobility management. The network may configure a potential set of CSI-RS resources of both serving cell and neighbor cells for a UE to monitor and measure. The UE may perform the measurements, such as a signal to noise ratio (SINR) measurement, a reference signal received quality (RSRQ) measurement, a reference signal received power (RSRP) measurement, or the like. The measurements may help to identify one or more target cells for the UE based on a comparison of the serving cell measurements to measurements of one or more neighbor cells. It may be helpful for a network to receive measurements that are specific to a serving cell and independent of non-serving cells. However, when configured to provide mobility measurements, the UE may provide measurements for the serving cell and detected non-serving cells.

Aspects presented herein enable a UE to report serving cell specific CSI-RS RRM measurements, e.g., for a mobility measurement report. For example, the UE may provide measurements for the serving cell to the network without, or independent of, reporting measurements for a non-serving cell. Similarly, the UE may report measurements for a serving beam for the serving cell, e.g., without reporting measurements for non-serving beams. The serving cell measurements may enable the UE to reduce memory use by not collecting non-serving cell, or non-serving beam, metrics. The aspects may enable a reduction in UE complexity by enabling the UE to perform serving cell layer 3 measurements without employing measurement gaps that might be used to perform measurements for a non-serving cell. The serving cell measurements may inform the network of the loading and interference caused by neighbor cell traffic from the perspective of the UE.

In some wireless communication systems, drive testing is used for measuring network performance such as uplink/ downlink coverage, cell power, interference, quality of service, call drop for UE, throughput, handover performance, cell reselection performance, or the like. The UE may measure and report information about such network performance using a minimization of drive tests (MDT) mechanism. A UE with MDT enabled may periodically report GPS location of the UE (if the GPS receiver is enabled and the UE supports GPS reporting over Layer 3) and automatically perform CSI-RS L3 measurements for RRM/mobility management, such as a signal to noise ratio (SINR) measurement, a reference signal received quality (RSRQ) measurement, a reference signal received power (RSRP) measurement, or the like. The UE may also log the measurement results and report the measurements to the network. It may be helpful for a network to receive measurements that are specific to a serving cell and independent of non-serving cells. However, when configured to provide MDT measurements, the UE may provide measurements for the serving cell and the non-serving cell.

Aspects presented herein enable a UE to report serving cell specific measurements, e.g., for MDT and/or radio resource management (RRM) measurements for a mobility measurement report. For example, the UE may provide measurements for the serving cell to the network without, or independent of, reporting measurements for a non-serving cell. Similarly, the UE may report measurements for a serving beam for the serving cell, e.g., without reporting measurements for non-serving beams. The serving cell measurements may enable the UE to reduce memory use by not collecting non-serving cell, or non-serving beam, metrics. The aspects may enable a reduction in UE complexity by enabling the UE to perform serving cell layer 3 measurements without employing measurement gaps that might be used to perform measurements for a non-serving cell. The serving cell measurements may inform the network of the loading and interference caused by neighbor cell traffic from the perspective of the UE.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies.

Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a measurement component 198 configured to transmit, to a base station 102 or 180, an indication indicating support for reporting one or more serving cell CSI-RS RRM measurements independent of non-serving cell CSI-RS RRM measurements. The measurement component 198 may be configured to receive, from the base station, a configuration of layer 3 measurement resources. The measurement component 198 may be configured to perform, based on the configuration of the layer 3 measurement resources, the one or more serving cell CSI-RS RRM measurements. The measurement component 198 may be configured to transmit, to the base station 102 or 180, the one or more serving cell CSI-RS RRM measurements for a serving cell.

In certain aspects, the base station 102 or 180 may include a measurement processing component 199 configured to receive, from a UE 104, an indication indicating support for reporting one or more serving cell CSI-RS RRM measurements independent of non-serving cell CSI-RS RRM measurements. The measurement processing component 199 may be configured to transmit, to the UE 104, a configuration of layer 3 measurement resources responsive to receiving the indication. The measurement processing component 199 may be configured to receive, from the UE, the one or more serving cell CSI-RS RRM measurements for a serving cell.

The UE 104 may include a measurement component 198 configured to receive, from a base station 102 or 180, a configuration of layer 3 measurement objects for a serving cell. The measurement component 198 may be configured to perform, based on the configuration of the layer 3 measurement objects, one or more serving cell measurements of one or more layer 3 measurement reference signal resources for the serving cell. The measurement component 198 may be configured to transmit, to the base station, a serving cell report of the one or more serving cell measurement reference signal resources of the layer 3 measurement objects.

In certain aspects, the base station 102 or 180 may include a measurement processing component 199 configured to transmit, to a UE 104, a configuration of layer 3 measurement objects for a serving cell. The measurement processing component 199 may be configured to receive, from the UE 104, a serving cell report of one or more serving cell measurement reference signal resources of the layer 3 measurement objects.

Figure 2:
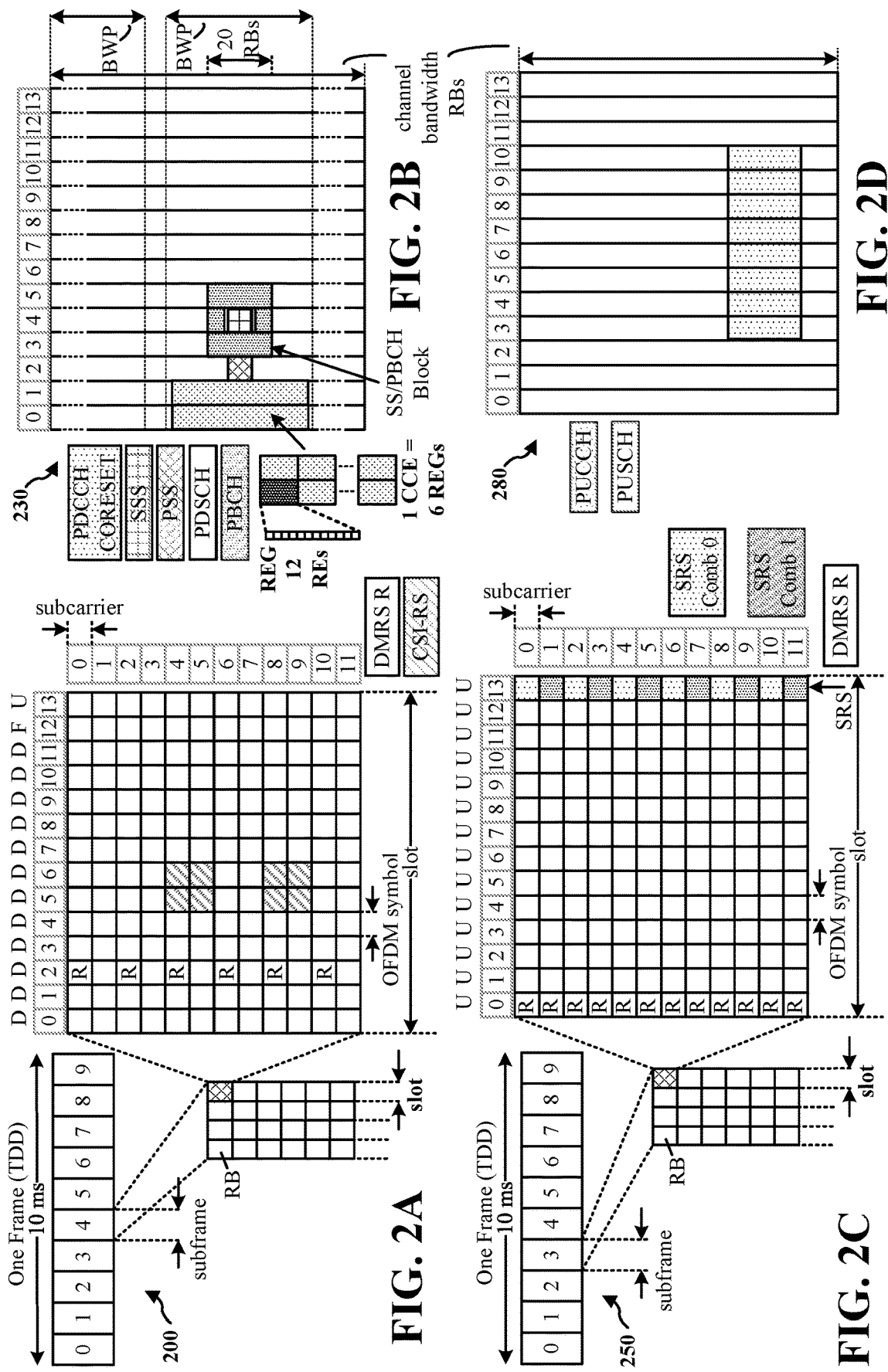
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu *15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in some aspects. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
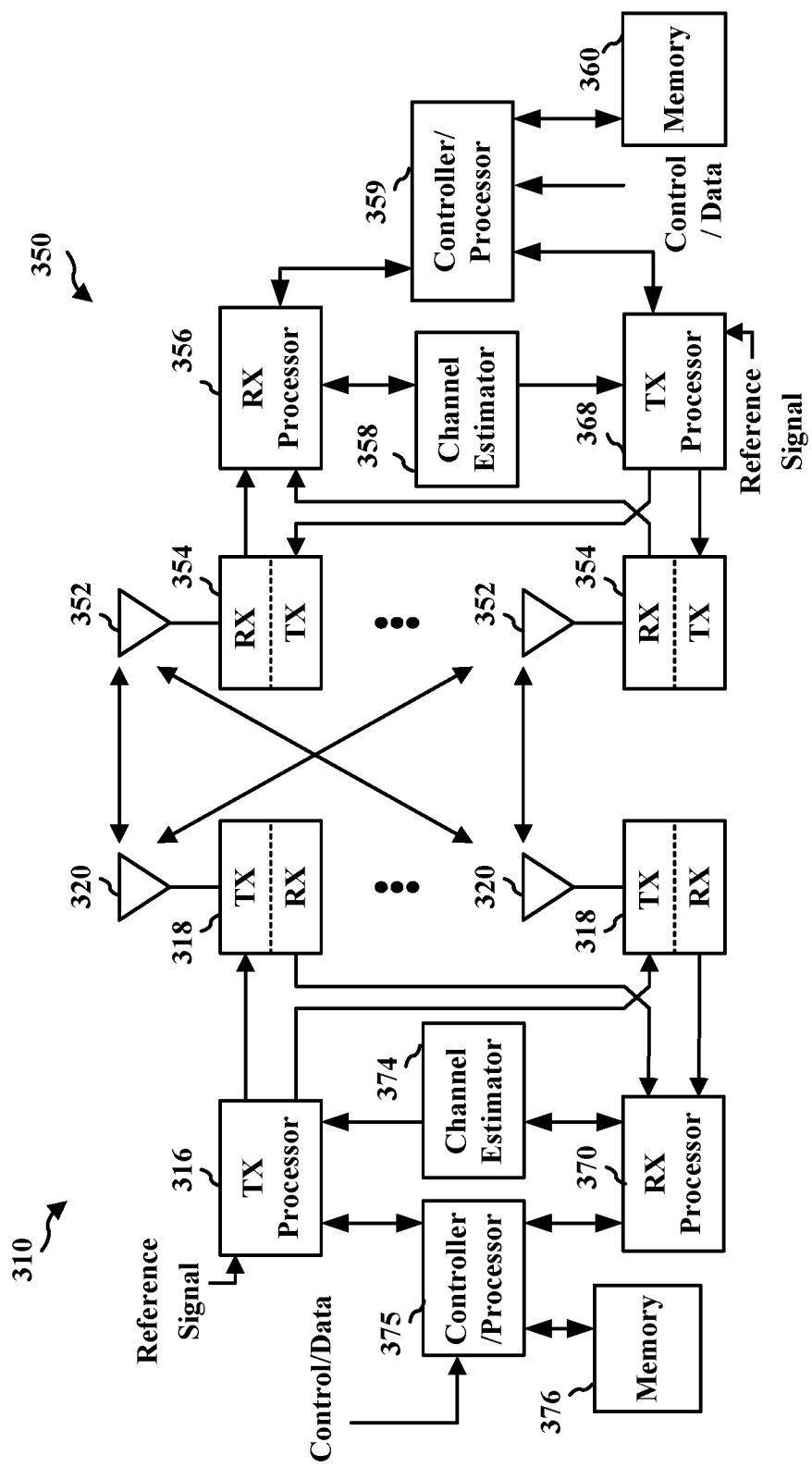
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with measurement component 198 of FIG. 1.

At least one of the TX processor 316, the RX processor 370, and the controller/processor 375 may be configured to perform aspects in connection with measurement processing component 199 of FIG. 1.

In some wireless communication systems, CSI-RS signals may be used for RRM/mobility control, such as layer 3 CSI-RS RRM (which may be referred to as layer 3 CSI-RS, CSI-RS L3, or CSI-RS RRM). A UE may report to the network that it supports CSI-RS RRM with or without associated SSBs. The network may configure a potential set of CSI-RS resources of both serving cell and neighbor cells for a UE to monitor and measure. The UE may perform the measurements, such as a signal to noise ratio (SINR) measurement, a reference signal received quality (RSRQ) measurement, a reference signal received power (RSRP) measurement, or the like. The UE may also log the measurement results and report the measurements to the network. In some wireless communication systems, the UE may provide a capability parameter that indicates support for the CSI-RS measurements, such as by indicating a UE capability for a csi-RSRP-AndRSRQ-MeasWithSSB or csi-RSRP-AndRSRQ-MeasWithoutSSB, to the network. Both parameters may indicate whether the UE can perform CSI-RSRP and CSI-RSRQ measurements for layer 3 measurement objects, e.g., for RRM/mobility control. For example, the csi-RSRP-AndRSRQ-MeasWithSSB capability may indicate that whether the UE can perform CSI-RSRP and CSI-RSRQ measurements, where the CSI-RS resource is configured with an associated SS/PBCH. If the UE indicates different support for this UE capability for different frequency ranges, e.g., FR1 and FR2, each indication may correspond to the frequency range of a measured target cell. If the UE supports the feature (e.g., csi-RSRP-AndRSRQ-MeasWithSSB), the UE may need to report a maximum number of CSI-RS measurements based on a number indicated by the network (e.g., maxNumberCSI-RS-RRM-RS-SINR). The csi-RSRP-AndRSRQ-MeasWithoutSSB may indicate whether the UE can perform CSI-RSRP and CSI-RSRQ measurements, where the CSI-RS resource is configured for a cell that transmits SS/PBCH block and without an associated SS/PBCH block. If the UE indicates different support for this UE capability for different frequency ranges, e.g., each indication may correspond to the frequency range of measured target cell. If the UE supports the feature (e.g., csi-RSRP-AndRSRQ-MeasWithSSB), the UE may need to report a maximum number of CSI-RS measurements based on a number indicated by the network (e.g., maxNumber-CSI-RS-RRM-RS-SINR). The UE capability indication indicates a capability to perform measurements for multiple cells, e.g., without distinguishing between a serving cell and non-serving cells. Thus, neither capability indication enables the UE to perform measurements that are specific to the serving cell CSI-RS RRM resources, such as for evaluating the interference from neighbor cell traffic, independent of neighboring-cell CSI-RS RRM measurements. The serving cell specific measurements may be more efficient for the UE. Aspects provided herein enables a UE to measure serving cell CSI-RS RRM resources independent of neighboring-cell CSI-RS RRM measurements, e.g., without measuring and/or reporting neighboring cell CSI-RS RRM measurements.

Figure 4:
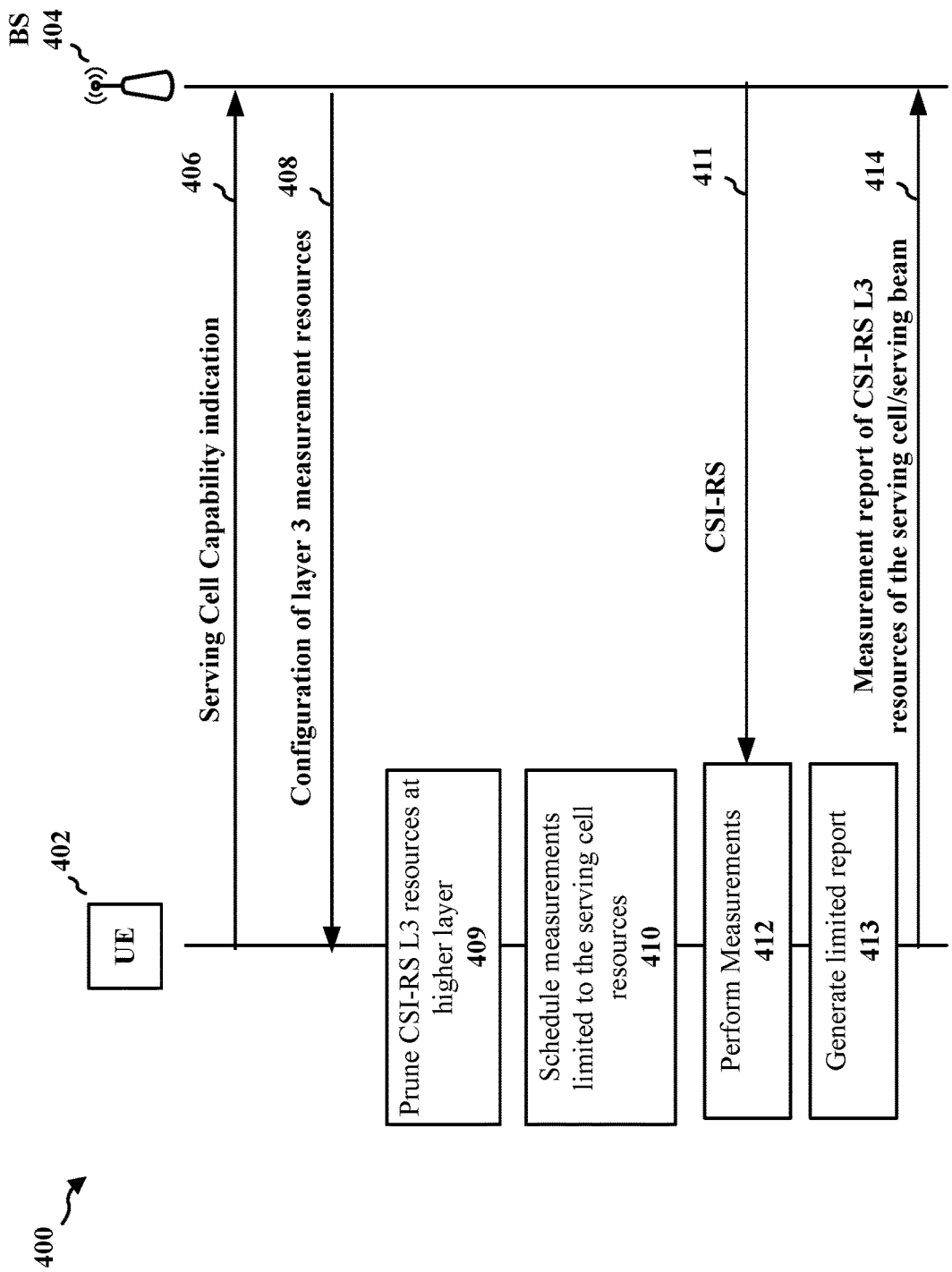
FIG. 4 illustrates example communications between a UE and a base station.

FIG. 4 illustrates an example communication flow 400 between a UE 402 and a base station 404. As illustrated in FIG. 4, the UE 402 may transmit a capability indication 406 indicating support for serving cell CSI-RS L3 measurements without non-serving cell (e.g., neighboring cell) CSI-RS L3 measurements to the base station 404. In some examples, the capability may be referred to as a capability for serving cell only measurements/reporting. The capability may indicate that the UE may perform measurements and/or reporting for L3 measurement objects of the serving cell independent of measurement/reporting for non-serving cells. For example, the capability may indicate that the UE may limit measurements to CSI-RS L3 resources belonging to the serving cell. As one example, the capability may be referred to as a csi-RSRP-AndRSRQ-Meas-ServingCell parameter. However, the UE capability parameter for measurements of CSI-RS L3 resources that are limited to a serving cell may also be referred to by a different name. In some examples, if the UE 402 indicates support for the measurements of CSI-RS L3 resources that are limited to a serving cell (e.g., indicates support for csi-RSRP-AndRSRQ-Meas-ServingCell), the UE may not indicate support for another capability for measurements of CSI-RS L3 resources of the serving cell and non-serving cells (e.g., may not indicate support for csi-RSRP-AndRSRQ-MeasWithSSB and csi-RSRP-AndRSRQ-MeasWithoutSSB).

The capability indication 406 may indicate to the base station 404 that the UE 402 does not intend to enable full RRM/mobility. The base station 404 may utilize the UE's capability for optimizing the deployment via analysis of interference. In some aspects, the capability indication may further indicate that the UE 402 supports serving cell CSI-RS L3 measurements that are limited to the serving beam, e.g., without measurements for the non-serving beams.

The base station 404 configures layer 3 measurement resources 408 for the UE 402. In some aspects, the base station may transmit the configuration of layer 3 measurement resources 408 that only includes layer 3 measurement resources for the serving cells to the UE 402. Based on the configuration, the UE 402 may limit measurements/reporting to the serving cell layer 3 measurement resources.

In some aspects, the base station may transmit a configuration of layer 3 measurement resources 408 that includes CSI-RS L3 resources 411 for the serving cells to the UE 402 and CSI-RS L3 resources for one or more non-serving cells. In some aspects, the UE 402 may extract the CSI-RS L3 resources of the serving cell at a higher layer of the UE, at 409, and may provide the extracted CSI-RS L3 resources of the serving cell to a lower layer of the UE to perform the measurements. Thus, the higher layer may perform an action to limit the L3 measurements to the serving cell. For example, the UE 402's radio resource control (RRC) layer may prune/remove CSI-RS L3 resources corresponding to neighbor cells based on their cell identifiers (IDs), at 409. In some aspects, the measurements of the serving cell's CSI-RS L3 resources 411 may be performed at a lower layer of the UE. For example, at 410, the UE 402's measurement scheduler may choose to measure the serving cell resources without measuring the neighboring cell resources by scheduling measurements for the serving cell's CSI-RS L3 resources without scheduling measurements for non-serving cell CSI-RS L3 resources.

As illustrated at 412, the UE 402 may perform the measurements of the configured CSI-RS L3 resources, e.g., of the CSI-RS transmitted by the base station 404. The measurement may include serving cell specific layer 3 measurements such as SINR, RSRQ, RSRP, or the like.

In some aspects, the UE 402 may perform measurements, at 412, for both the serving cell and non-serving cell CSI-RS L3 resources. Then, at 413, the UE 402's measurement report generation may be limited to the measurement results of serving cell CSI-RS L3 resources without including the neighboring cell measurements in the report.

In some aspects, the UE capability indicated at 406 may be a capability to measure/report CSI-RS L3 resources that are limited to a serving beam of the UE, e.g., measuring/reporting the CSI-RS L3 resources of the serving beam and not for other beams. As an example, the UE capability may be referred to as csi-RSRP-AndRSRQ-Meas-ServingBeam. If the UE indicates support for measuring/reporting the CSI-RS L3 resources of the serving beam and not for other beams (e.g., support for csi-RSRP-AndRSRQ-Meas-ServingBeam), the UE may not indicate support for the other UE capabilities (e.g., for measurement/reporting of CSI-RS L3 of the serving cell (e.g., csi-RSRP-AndRSRQ-Meas-ServingCell that indicates support for measurements of more than the serving beam, csi-RSRP-AndRSRQ-MeasWithSSB that indicates support for measurements without limitation to the serving cell, and csi-RSRP-AndRSRQ-MeasWithout SSB that indicates support for measurements without limitation to the serving cell). Similar to csi-RSRP-AndRSRQ-Meas-ServingCell, csi-RSRP-AndRSRQ-Meas-ServingBeam may indicate to the base station 404 that the UE 402 does not intend to enable RRM/mobility and instead intends to provide serving cell specific measurements and reports. The network may then use the UE's capability to optimize deployment via an analysis of interference over a particular serving beam, as reported by the UE.

At 412, the UE 402 may perform measurements for a serving beam of the serving cell and not for the non-serving beams. The UE may limit monitored resources to those associated with the serving beam of the serving cell. Each CSI-RS RRM resource may be configured with an associated SSB and cell ID. In some aspects, the UE 402 may determine whether a particular CSI-RS L3 resource is associated with the serving SSB based on the TCI state on its serving cell and perform measurements on the CSI-RS L3 resource(s) that is associated with the serving SSB and may refrain from performing measurements on the CSI-RS L3 resource(s) that is not associated with the serving SSB, e.g., based on a higher layer determination at 409 or a lower layer determination at 410. For example, the UE 402 may check if a cell identifier (ID) associated with the CSI-RS L3 resource is identical to a serving cell ID associated with the UE and check if an SSB ID associated with the CSI-RS L3 resource is identical to a serving cell SSB associated with the UE.

Thus, the RRC layer may prune the CSI-RS L3 resources correspond to non-serving beams and neighbor cells based on the associated SSB ID and cell ID, the UE measurement scheduler may schedule measurements limited to the RRM resources associated with the serving beam of the serving cell, or the UE may generate an RRM/mobility report that is limited to the measurements on the serving beam associated CSI-RS L3 resources.

At 414, the UE 402 transmits the report including the measurements of the serving cell CSI-RS L3 resources and not the neighboring cell measurements. The report may include a RRM/mobility control report.

In some wireless communication systems, drive testing is used for measuring network performance such as uplink/downlink coverage, cell power, interference, quality of service, call drop for UE, throughput, handover performance, cell reselection performance, or the like. The network performance may be measured based on a MDT mechanism. A UE with MDT enabled may periodically report a GPS location of the UE (if the GPS receiver is enabled and the UE supports GPS reporting over Layer 3) and may perform CSI-RS L3 measurements for RRM/mobility management, such as an SINR measurement, an RSRQ measurement, an RSRP measurement, or the like. The UE may report the measurements to the network. In some examples, the UE may log the measurement results and report the logged measurements to the network.

A UE may indicate, e.g., in one or more capability bit, support for logged MDT in RRC idle and inactive mode to indicate that the UE supports logging of downlink pilot strength measurements and event-triggered logging. Based on the capability indication, the UE may transmit the MDT report with MDT measurements for multiple cells. As the capability is for RRC idle and inactive modes, the UE may not distinguish between a serving cell and neighbour cells when perform the measurements or providing the MDT report.

The MDT report may be in one of different forms, such as logged MDT or an immediate MDT. A logged MDT report may refer to an MDT that includes measurements that have been buffered at the UE and reported at a later time. An immediate MDT may refer to a run-time MDT in which the UE reports the measurements when the UE performs the measurements rather than storing the measurements to send at a later time for a logged MDT, the measurement quantities for downlink pilot strength measurement logging may be fixed. In an RRC connected mode, the UE may provide immediate MDT and DL signal measurement results for the serving cell and for intra-frequency/Inter-frequency/inter-RAT neighbor cells, including cell/beam level measurement.

A UE may perform mobility management report, or RRM, measurements and may provide information about the measurements to the network. In a multi-cell deployment, the network may assign CSI-RS resources in each cell over different directions for finer coverage. The UE may be served by a particular serving cell within the multiple cells of the network. Periodic CSI-RS resources may be assigned for cell specific measurements. The UE may indicate support for CSI-RS L3 measurements to the network via a capability indication (such as a csi-RSRP-AndRSRQ-MeasWithSSB) that indicates whether the UE can perform CSI-RSRP and CSI-RSRQ measurements. A CSI-RS resource may be configured with an associated SS/PBCH. If the parameter is indicated by the UE for FR1 and FR2 differently, each indication may correspond to the frequency range of measured target cells. If the UE supports this feature of CSI-RS L3 measurements, the UE reports a maximum number of CSI-RS RRM RS SINR measurements (e.g., based on maxNumberCSI-RS-RRM-RS-SINR). Thus, when the UE is configured with L3 measurement resources, the UE reports measurements for neighbor cells and the serving cell. The capability indicates support for measurements, e.g., of target cells for mobility management. As the capability is not specific to the serving cell, if the network configures the UE with CSI-RS resources from both the serving cell and neighbor cells, the UE monitors and measures the configured resources without regard to the type of cell, e.g., whether the cell is a serving cell or a neighbor cell. Neither MDT nor CSI-RS RRM enables the UE to measure and report the serving cell CSI-RS and/or SSB metrics (e.g., RSRQ, SNR, RSRP) without measuring and/or reporting the neighbor cell CSI-RS and/or SSB metrics.

However, performing such measurements (e.g., for MDT report or CSI-RS RRM) on the serving cell and neighboring cells, e.g., in a periodic or automatic manner, may be inefficient for the UE. In some MDT use cases, it may be more efficient for the UE to only measure and report the serving cell resources, but the MDT report may include measurements for both the serving cell and for neighbor cells. Aspects provided herein enable the UE to efficiently support serving cell measurements for MDT, e.g., independent of or without neighbor cell measurements. For example, a UE may perform serving cell measurements for MDT without performing neighboring cell measurements. The UE may report serving cell measurements for MDT without reporting, or independent of reporting, neighbor cell measurements for MDT. For example, a network operator may prefer for the UE to provide measurements on the resources of serving cell only. Aspects presented herein enable an MDT feature that includes the serving cell specific layer 3 measurements e.g. SINR, RSRQ and/or RSRP. For example, aspects presented herein may enable the UE to process the measurements only on the serving cell layer 3 reference signal resources. Aspects may enable the UE and the network to collaborate to provide the serving cell specific measurements if, the UE is configured with layer 3 measurement resources such as SSB and/or CSI-RS in measurement objects; and the UE indicates the capability for the support of serving cell only measurements explicitly or implicitly. The UE may report the serving cell specific measurements as immediate MDT or logged MDT reports.

Depending on the implementation, the UE may report the serving cell specific measurements in mobility measurement reports. The serving cell measurements/reports may enable the UE to reduce memory use by not collecting non-serving cell, or non-serving beam, metrics. The aspects may enable a reduction in UE complexity by enabling the UE to perform serving cell layer 3 measurements without employing measurement gaps that might be used to perform measurements for a non-serving cell. The serving cell measurements may inform the network of the loading and interference caused by neighbor cell traffic from the perspective of the UE.

Figure 5:
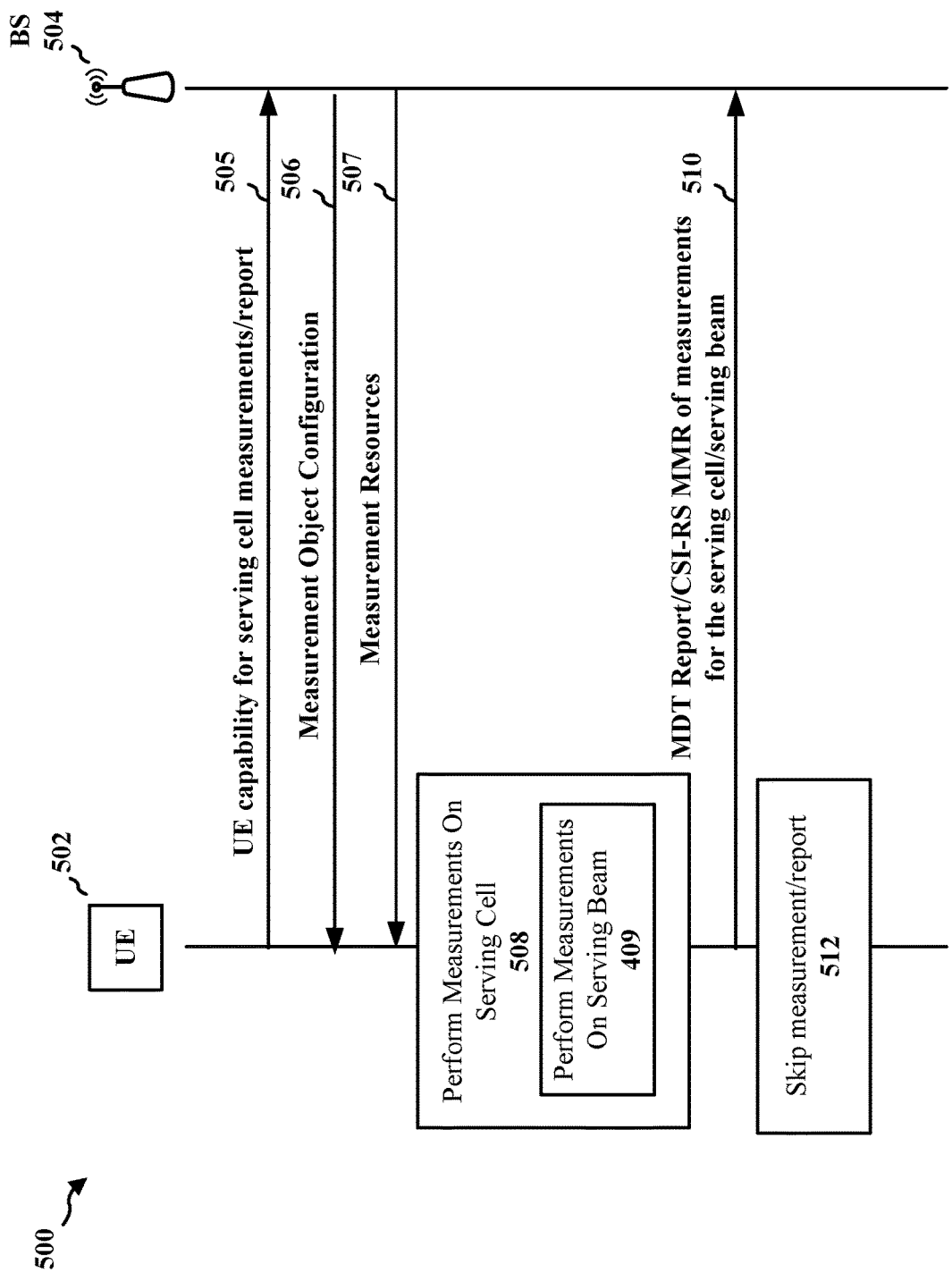
FIG. 5 illustrates example communications between a UE and a base station.

FIG. 5 illustrates an example communication flow 500 between a UE 502 and a base station 504 that includes MDT reporting and/or CSI-RS RRM reporting for a serving cell. The UE 502 may indicate a UE capability 505 to the network informing the network that the UE supports measurement/reporting of L3 measurement objects for the serving cell, e.g., without, or separate from, neighbor cells. In some aspects, the UE capability indication 505 may further include an explicit UE capability indication that indicates that the UE 502 supports serving cell measurements without supporting neighboring cell measurements or independent of neighboring cell measurements. The UE capability indication may be an explicit indication for a UE capability for measuring CSI-RS L3 resources only for the serving cell. In some examples, the UE capability may be for reporting measurements of a serving beam of the serving cell, e.g., without reporting measurements for the non-serving beams. The UE capability indication may be for MDT, and may correspond to a UE capability to report measurements on the serving cell CSI-RS RRM resources as part of an MDT report. In some aspects, the indication of the UE capability 505 may include a proprietary or dummy bit in a different UE capability. When the base station detects the bit or indication in the different UE capability, the base station may determine that the UE 502 supports serving cell measurements without, or independent of, neighboring cell measurements, e.g., serving cell only measurements/reporting. In some aspects, the UE may use a PLMN ID of a particular network operator to determine whether to apply the serving cell measurements. For example, if the UE receives a PLMN ID of a network that deploys serving cell only CSI-RS RRM measurements, the UE may provide the UE capability (e.g., using a dummy bit or other indication) to inform the network that the UE supports the capability.

In some examples, the UE may determine to apply the serving cell only measurement/report configuration without informing the network of the UE's capability, e.g., without sending the UE capability indication 505.

As illustrated in FIG. 5, the UE 502 may receive a measurement object configuration 506 from the base station 504 such that the UE 502 is configured with layer 3 measurement resources 507, such as SSB and/or CSI-RS, for one or more measurement objects. The measurement objects may be configured for the UE in RRC signaling. In some aspects, the UE 502 may detect that CSI-RS based mobility has been enabled by a network (e.g., the network that the base station 504 is in) by checking a field in the measurement object configuration 506, such as a csi-rs-ResourceConfigMobility in a RRC signaling. In some aspects, alternatively or additionally, the UE 502 may receive UE assistance information (UAI) from the base station 504 that indicates the measurement object configuration 506.

In some aspects, the measurement object configuration 506 may include CSI-RS RRM resources for the serving cell without including CSI-RS RRM resources for the neighboring cell. The network may configure the resources based on the UE capability information provided by the UE. The UE may determine to provide the serving cell only measurements based on the configuration of the resources for the serving cell without resources for the neighboring cells. Based on the measurement object configuration 506, the UE 502 may perform measurements on the serving cell at 508 and may transmit the measurements in an MDT report 510 to the base station 504.

In some aspects, the MDT report may be an immediate MDT report. In other aspects, the MDT report may be a logged MDT report.

The measurement may include serving cell specific layer 3 measurements such as SINR, RSRQ, RSRP, or the like. In some aspects, if the measurement object configuration 506 includes CSI-RS RRM resources for the serving cell without including CSI-RS RRM resources for the neighboring cell, the UE 502 may perform the measurements on the serving cells without performing the measurements on the neighboring cell.

The measurement object configuration 506 may additionally include CSI-RS RRM resources for the neighboring cells. In some aspects, if the measurement object configuration 506 includes CSI-RS RRM resources for the serving cell and the neighboring cells, the UE 502 may still perform the measurements on the serving cells without performing the measurements on the neighboring cell. If the network configures RRM resources for multiple cells (e.g., the serving cell and one or more neighbor cells), the UE may measure and report the measurement(s) (e.g., RSRP/RSRQ/SNR) for the serving cell CSI-RS resources without measuring and/or reporting the neighboring cell resources. For example, the UE 502 may skip measurement/reporting of the configured neighbor cells resources based on the UE's support for serving cell measurements. In other aspects, if the UE is configured with RRM resources for multiple cells, the UE may skip measurement/reporting. For example, if the measurement object configuration 506 includes CSI-RS RRM resources for the serving cell and the neighboring cells, the UE 502 may refrain from performing the measurements and/or may refrain from reporting the measurements to the base station 504, e.g., as illustrated at 512.

In some aspects, the UE 502 may perform measurements for a serving beam of the serving cell without performing measurements for the non-serving beams. For example, the capability 505 may indicate that the UE supports measurement/reporting that is specific to the serving beam of the serving cell, e.g., without reporting measurements for non-serving beams. The capability indication may be an explicit indication for a UE capability for reporting measurements of the serving beam of the serving cell, e.g., without reporting other beams/cells. The capability indication may be indicated using one or more bits (e.g., dummy bits or reserved bits) of a different UE capability. In some aspects, the UE 502 may determine whether a particular CSI-RS RRM resource is associated with the serving SSB based on the TCI state on its serving cell and perform measurements on the CSI-RS RRM resource(s) that is associated with the serving SSB and may refrain from performing measurements on the CSI-RS RRM resource(s) that is not associated with the serving SSB. As illustrated at 509, the UE may perform the measurements for the serving beam of the serving cell, e.g., without performing the measurements for non-serving beams. For example, The UE 502 may check if a cell identifier (ID) associated with the CSI-RS RRM resource is identical to a serving cell ID associated with the UE and check if an SSB ID associated with the CSI-RS RRM resource is identical to a serving cell SSB associated with the UE. In some examples, the UE use an explicit or implicit indication from the base station 504 to perform the serving beam only measurements and/or to provide serving beam only reports, such as described above for the serving cell only measurement/report. In some aspects, the UE 502 may report measurements on the CSI-RS RRM resources associated with the serving SSB in each report.

Thus, the report 510 may include measurements that are for the serving cell without including measurements for non-serving cells. The report 510 may include measurements for the serving beam without including measurements for other beams.

Figure 6:
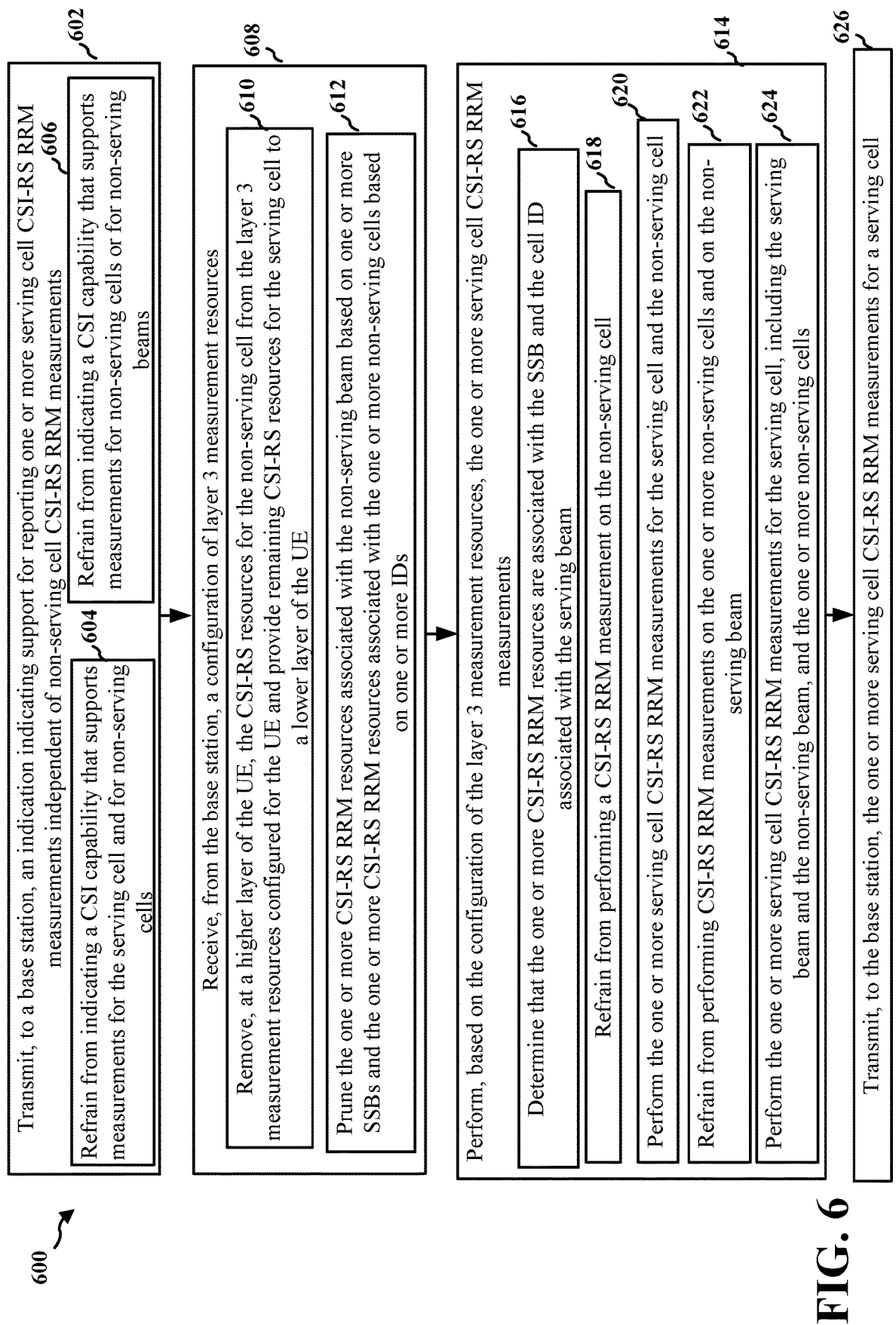
FIG. 6 is a flowchart of a method of wireless communication.

FIG. 6 is a flowchart 600 of a method of wireless communication. The method may be performed by a UE (e.g., the UE 104; the apparatus 1002). The method may enable a UE and a base station to efficiently support serving cell based CSI-RS RRM measurements.

At 602, the UE may transmit, to a base station, an indication indicating support for reporting one or more serving cell CSI-RS RRM measurements independent of non-serving cell CSI-RS RRM measurements. For example, 602 may be performed by UE capability indication component 1042 in FIG. 10. In some aspects, as part of 602, at 604, the UE refrains from indicating a CSI capability that supports measurements for the serving cell and for non-serving cells. In some aspects, as part of 602, at 606, the UE refrains from indicating a CSI capability that supports measurements for non-serving cells or for non-serving beams. In some aspects, the indication is included in UE capability information associated with RRM or mobility. In some aspects, the indication further indicates that the support is for a serving beam of the serving cell, the serving beam being associated with an SSB and a cell ID, where the UE transmits the one or more serving cell CSI-RS RRM measurements for the serving beam of the serving cell and not for a non-serving beam (at 626).

At 608, the UE may receive, from the base station, a configuration of layer 3 measurement resources. For example, 608 may be performed by configuration reception component 1044 in FIG. 10. In some aspects, the layer 3 measurement resources include one or more CSI-RS for the serving cell and not for a non-serving cell. In some aspects, the layer 3 measurement resources include CSI-RS resources for the serving cell and a non-serving cell. In some aspects, as part of 608, at 610, the UE removes, at a higher layer of the UE, the CSI-RS resources for the non-serving cell from the layer 3 measurement resources configured for the UE and providing remaining CSI-RS resources for the serving cell to a lower layer of the UE. In some aspects, the higher layer removes the CSI-RS resources for the non-serving cell based on a cell ID for the non-serving cell. In some aspects, the configuration of the layer 3 measurement resources for the serving cell indicates one or more CSI-RS RRM resources associated with the SSB and the cell ID. In some aspects, the configuration of the layer 3 measurement resources for the serving cell further indicates one or more CSI-RS RRM resources associated with one or more non-serving cells. In some aspects, as part of 608, at 612, the UE prunes the one or more CSI-RS RRM resources associated with the non-serving beam based on one or more SSBs and the one or more CSI-RS RRM resources associated with the one or more non-serving cells based on one or more IDs.

At 614, the UE may perform, based on the configuration of the layer 3 measurement resources, the one or more serving cell CSI-RS RRM measurements. For example, 614 may be performed by measurement component 1046 in FIG. 10. In some aspects, as part of 614, at 616, the UE determines that the one or more CSI-RS RRM resources are associated with the SSB and the cell ID associated with the serving beam and perform the one or more serving cell CSI-RS RRM measurements using the one or more CSI-RS RRM resources. In some aspects, as part of 614, at 618, the UE refrains from performing a CSI-RS RRM measurement on the non-serving cell. In some aspects, as part of 614, at 620, the UE performs the one or more serving cell CSI-RS RRM measurements for the serving cell and the non-serving cell where the UE reports the one or more serving cell CSI-RS RRM measurements for the serving cell and not for the non-serving cell (at 626). In some aspects, the one or more serving cell CSI-RS RRM measurements include one or more of an SINR measurement, an RSRQ measurement, or an RSRP measurement. In some aspects, as part of 614, at 622, the UE refrains from performing CSI-RS RRM measurements on the one or more non-serving cells and on the non-serving beam. In some aspects, as part of 614, at 624, the UE performs the one or more serving cell CSI-RS RRM measurements for the serving cell, including the serving beam and the non-serving beam, and the one or more non-serving cells, where the UE transmits the one or more serving cell CSI-RS RRM measurements for the serving beam of the serving cell and does not report the one or more serving cell CSI-RS RRM measurements for the one or more non-serving cells and the non-serving beam.

At 626, the UE may transmit, to the base station, the one or more serving cell CSI-RS RRM measurements for a serving cell. For example, 626 may be performed by reporting component 1048 in FIG. 10. In some aspects, the UE transmits, to the base station, the one or more serving cell CSI-RS RRM measurements of the serving cell and not of the non-serving cell.

Figure 7:
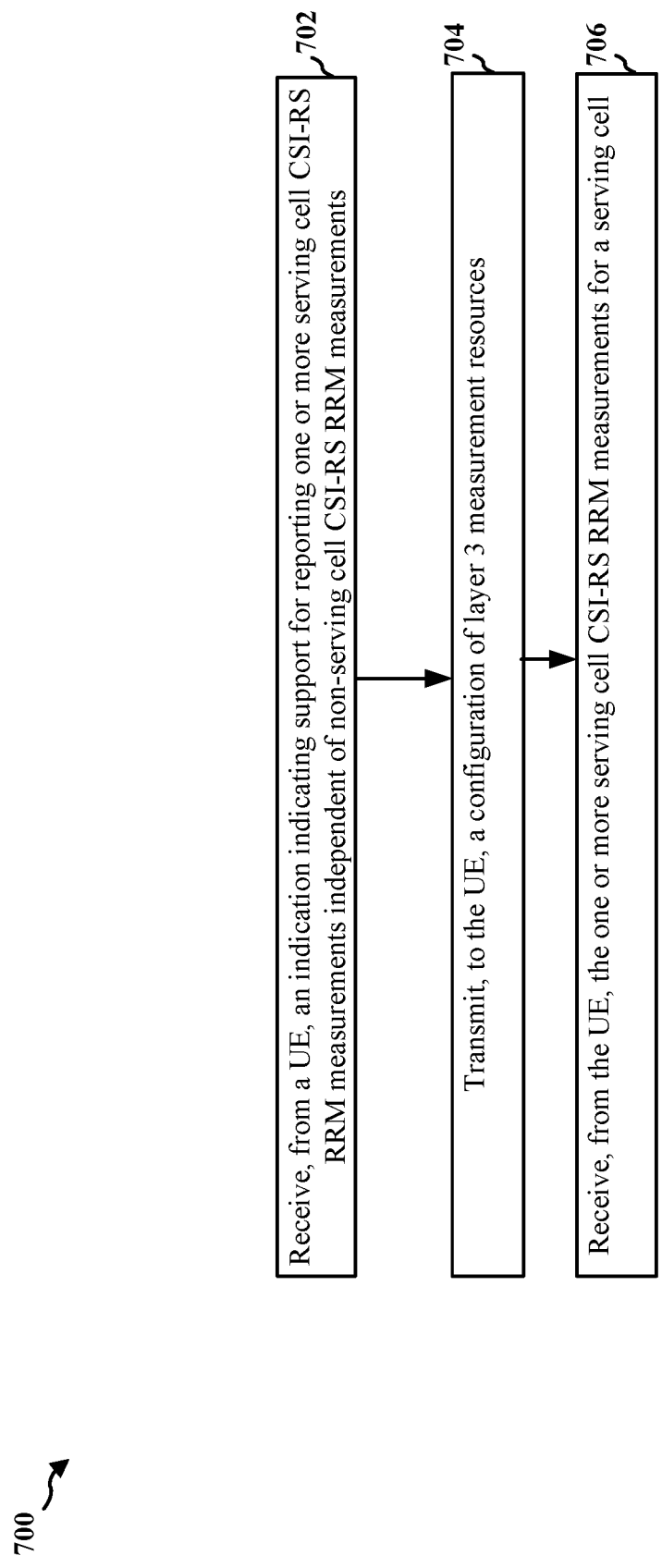
FIG. 7 is a flowchart of a method of wireless communication.

FIG. 7 is a flowchart 700 of a method of wireless communication. The method may be performed by a base station (e.g., the base station 102/180; the apparatus 1102). The method may enable a UE and a base station to efficiently support serving cell based CSI-RS RRM measurements.

At 702, the base station may receive, from a UE, an indication indicating support for reporting one or more serving cell CSI-RS RRM measurements independent of non-serving cell CSI-RS RRM measurements. For example, 702 may be performed by indication reception component 1142 in FIG. 11. In some aspects, the indication is included in UE capability information associated with RRM or mobility.

At 704, the base station may, responsive to receiving the indication, transmit, to the UE, a configuration of layer 3 measurement resources. For example, 704 may be performed by configuration transmission component 1144 in FIG. 11. In some aspects, the layer 3 measurement resources include one or more CSI-RS for the serving cell and not for a non-serving cell. In some aspects, the layer 3 measurement resources include CSI-RS resources for the serving cell and a non-serving cell. In some aspects, the configuration of the layer 3 measurement resources for the serving cell indicates one or more CSI-RS RRM resources associated with a SSB and a cell ID.

At 706, the base station may receive, from the UE, the one or more serving cell CSI-RS RRM measurements for a serving cell. For example, 706 may be performed by measurement reception component 1146 in FIG. 11. In some aspects, the base station receives, from the UE, the one or more serving cell CSI-RS RRM measurements of the serving cell and not of the non-serving cell. In some aspects, the one or more serving cell CSI-RS RRM measurements include one or more of: an SINR measurement, an RSRQ measurement, or an RSRP measurement. In some aspects, the indication further indicates that the support is for a serving beam of the serving cell, the serving beam being associated with a SSB and a cell ID. In some aspects, the base station receives the one or more serving cell CSI-RS RRM measurements for the serving beam of the serving cell and not for a non-serving beam.

Figure 8:
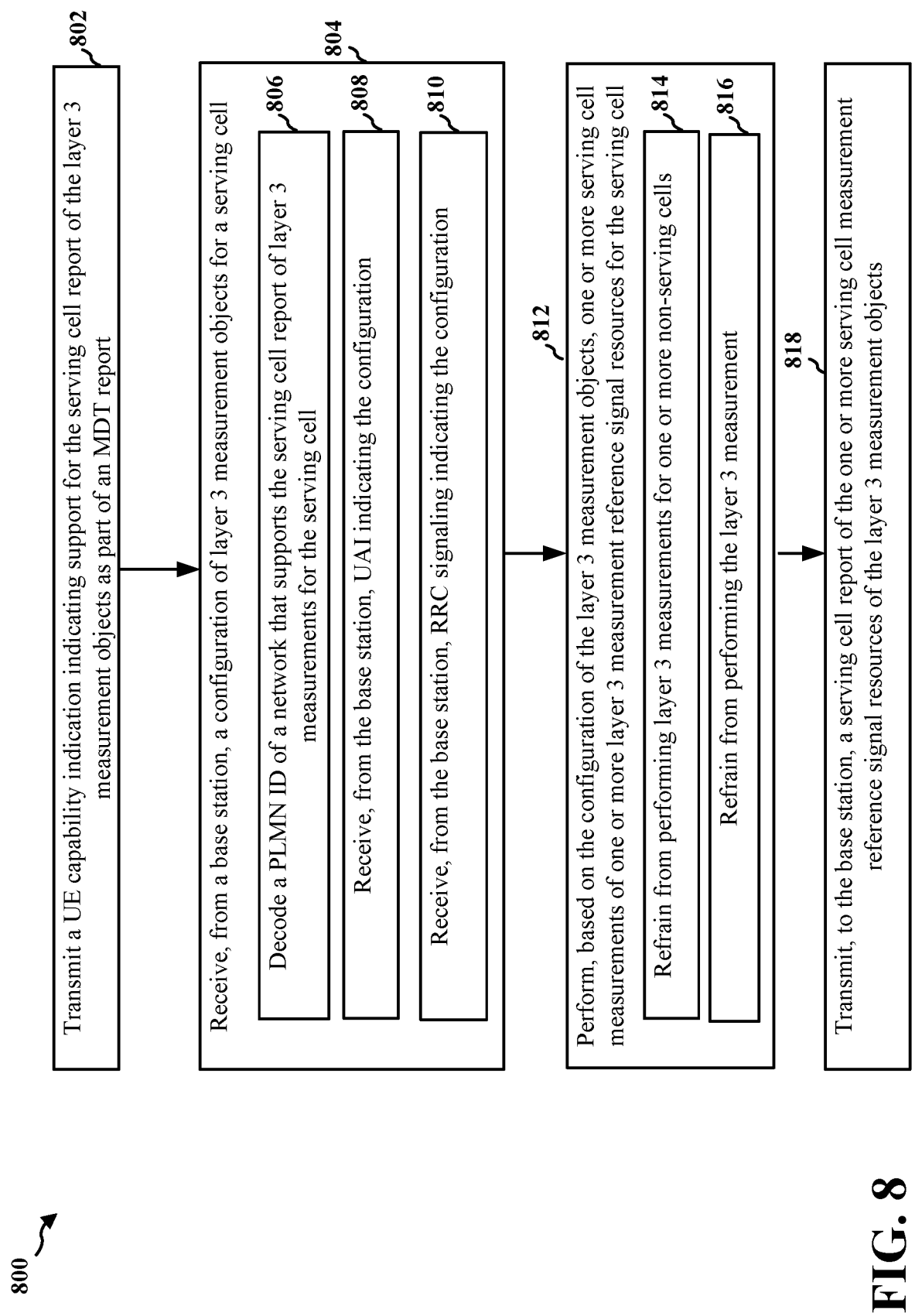
FIG. 8 is a flowchart of a method of wireless communication.

FIG. 8 is a flowchart 800 of a method of wireless communication. The method may be performed by a UE (e.g., the UE 104; the apparatus 1002). The method may enable a UE and a base station to efficiently support serving cell measurements for MDT.

At 802, the UE may transmit a UE capability indication indicating support for the serving cell report of the layer 3 measurement objects, such as a UE capability indication as part of an MDT report. For example, 802 may be performed by UE capability indication component 1042 in FIG. 10. In some aspects, the MDT report in transmission 802 may be an MDT report in transmission 818. In some aspects, the UE capability indication further indicates support for the serving cell report without reporting layer 3 measurements for non-serving cells. In some aspects, the UE capability indication is included in a capability field for the serving cell report. In some aspects, the UE capability indication further indicates support for a serving cell report for layer 3 measurements of a serving beam of the serving cell. In some aspects, the UE capability indication is included in one or more unused bit of a capability field for the same or a different capability than the serving cell report of layer 3 measurements for the serving cell.

At 804, the UE may receive, from a base station, a configuration of layer 3 measurement objects for a serving cell. For example, 804 may be performed by configuration reception component 1044 in FIG. 10. In some aspects, the configuration includes the layer 3 measurement objects for the serving cell. In some aspects, the configuration of the layer 3 measurement objects is for the serving cell and one or more non-serving cells. In some aspects, as part of 804, at 806, the UE receives, from the base station, UAI indicating the configuration. In some aspects, as part of 804, at 808, the UE receives, from the base station, RRC signaling indicating the configuration. In some aspects, as part of 804, at 810, the UE decodes a PLMN ID a network (such as the network that the base station is in) that supports the serving cell report of layer 3 measurements for the serving cell prior to the performing at 812.

At 812, the UE may perform, based on the configuration of the layer 3 measurement objects, one or more serving cell measurements of one or more layer 3 measurement reference signal resources for the serving cell. For example, 812 may be performed by measurement component 1046 in FIG. 10. In some aspects, performing, based on the configuration of layer 3 measurement objects, the one or more serving cell measurements includes performing the one or more serving cell measurements on the serving beam and not on a non-serving beam. In some aspects, as part of 812, at 814, the UE refrains from performing layer 3 measurements for one or more non-serving cells. In some aspects, as part of 812, at 816, the UE refrains from performing the layer 3 measurements or from reporting the layer 3 measurements if the UE receives the configuration of layer 3 measurement objects for multiple cells.

At 818, the UE may transmit, to the base station, a serving cell report of the one or more serving cell measurement reference signal resources of the layer 3 measurement objects. For example, 818 may be performed by reporting component 1048 in FIG. 10. In some aspects, the UE transmits the serving cell report of the one or more serving cell measurements of the layer 3 measurement objects in response to receiving the configuration of the layer 3 measurement objects for the serving cell. In some aspects, the serving cell report includes an MDT report of the one or more serving cell measurements of the layer 3 measurement objects. In some aspects, the MDT report is an immediate MDT report. In some aspects, the MDT report is a logged MDT report. In some aspects, the serving cell report includes a measurement report of RRM measurements for mobility management. In some aspects, the one or more serving cell measurements include one or more of: an SINR measurement, an RSRQ measurement, or an RSRP measurement. In some aspects, the serving cell report reports the one or more serving cell measurement reference signal resources of the layer 3 measurement objects without reporting non-serving cell measurements. In some aspects, the layer 3 measurement objects include resources based on one or more SSB for the serving cell. In some aspects, the layer 3 measurement objects include resources based on one or more CSI-RS for the serving cell.

Figure 9:
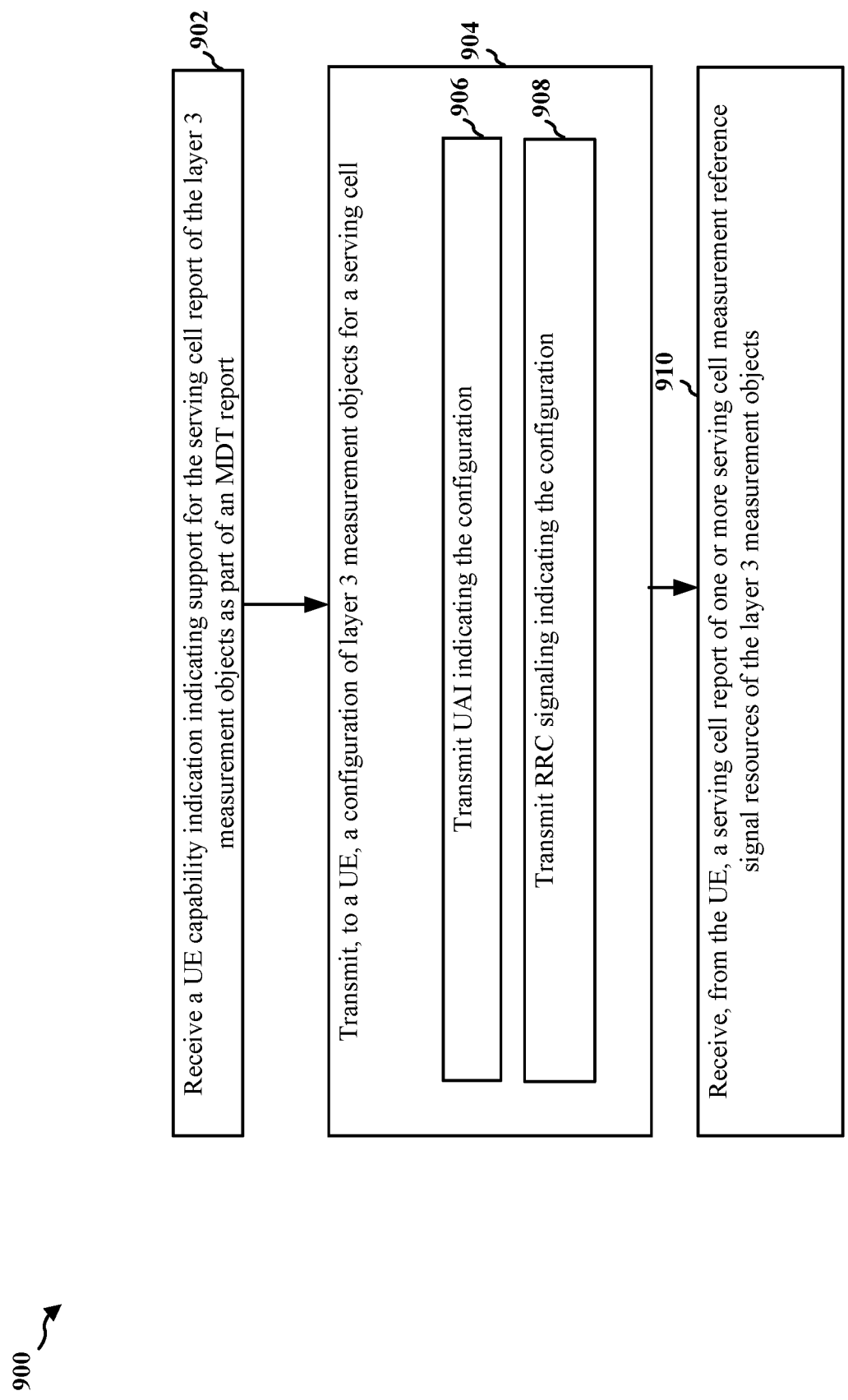
FIG. 9 is a flowchart of a method of wireless communication.

FIG. 9 is a flowchart 900 of a method of wireless communication. The method may be performed by a base station (e.g., the base station 102/180; the apparatus 1102. The method may enable a UE and a base station to efficiently support serving cell measurements for MDT.

At 902, the base station may receive a UE capability indication indicating support for the serving cell report of the layer 3 measurement objects, such as a UE capability indication as part of an MDT report. For example, 902 may be performed by indication reception component 1142 in FIG. 11. In some aspects, the MDT report in reception 902 may be an MDT report in reception 910. In some aspects, the UE capability indication further indicates support for the serving cell report without reporting layer 3 measurements for non-serving cells. In some aspects, the UE capability indication is included in a capability field for the serving cell report. In some aspects, the UE capability indication further indicates support for a serving cell report for layer 3 measurements of a serving beam of the serving cell. In some aspects, the UE capability indication is included in one or more unused bit of a capability field for the same or a different capability than the serving cell report of layer 3 measurements for the serving cell.

At 904, the base station may transmit, to a UE, a configuration of layer 3 measurement objects for a serving cell. For example, 904 may be performed by configuration transmission component 1144 in FIG. 11. In some aspects, the configuration includes the layer 3 measurement objects for the serving cell. In some aspects, the configuration of the layer 3 measurement objects is for the serving cell and one or more non-serving cells. In some aspects, as part of the 904, at 906, the base station transmits, to the UE, UAI indicating the configuration. In some aspects, as part of the 904, at 908, the base station transmits, to the UE, RRC signaling indicating the configuration.

At 910, the base station receives, from the UE, a serving cell report of the one or more serving cell measurement reference signal resources of the layer 3 measurement objects. For example, 910 may be performed by measurement reception component 1146 in FIG. 11. In some aspects, the UE transmits the serving cell report of the one or more serving cell measurements of the layer 3 measurement objects in response to receiving the configuration of the layer 3 measurement objects for the serving cell. In some aspects, the serving cell report includes an MDT report of the one or more serving cell measurements of the layer 3 measurement objects. In some aspects, the MDT report is an immediate MDT report. In some aspects, the MDT report is a logged MDT report. In some aspects, the serving cell report includes a measurement report of RRM measurements for mobility management. In some aspects, the one or more serving cell measurements include one or more of: an SINR measurement, an RSRQ measurement, or an RSRP measurement. In some aspects, the serving cell report reports the one or more serving cell measurement reference signal resources of the layer 3 measurement objects without reporting non-serving cell measurements. In some aspects, the layer 3 measurement objects include resources based on one or more SSB for the serving cell. In some aspects, the layer 3 measurement objects include resources based on one or more CSI-RS for the serving cell.

Figure 10:
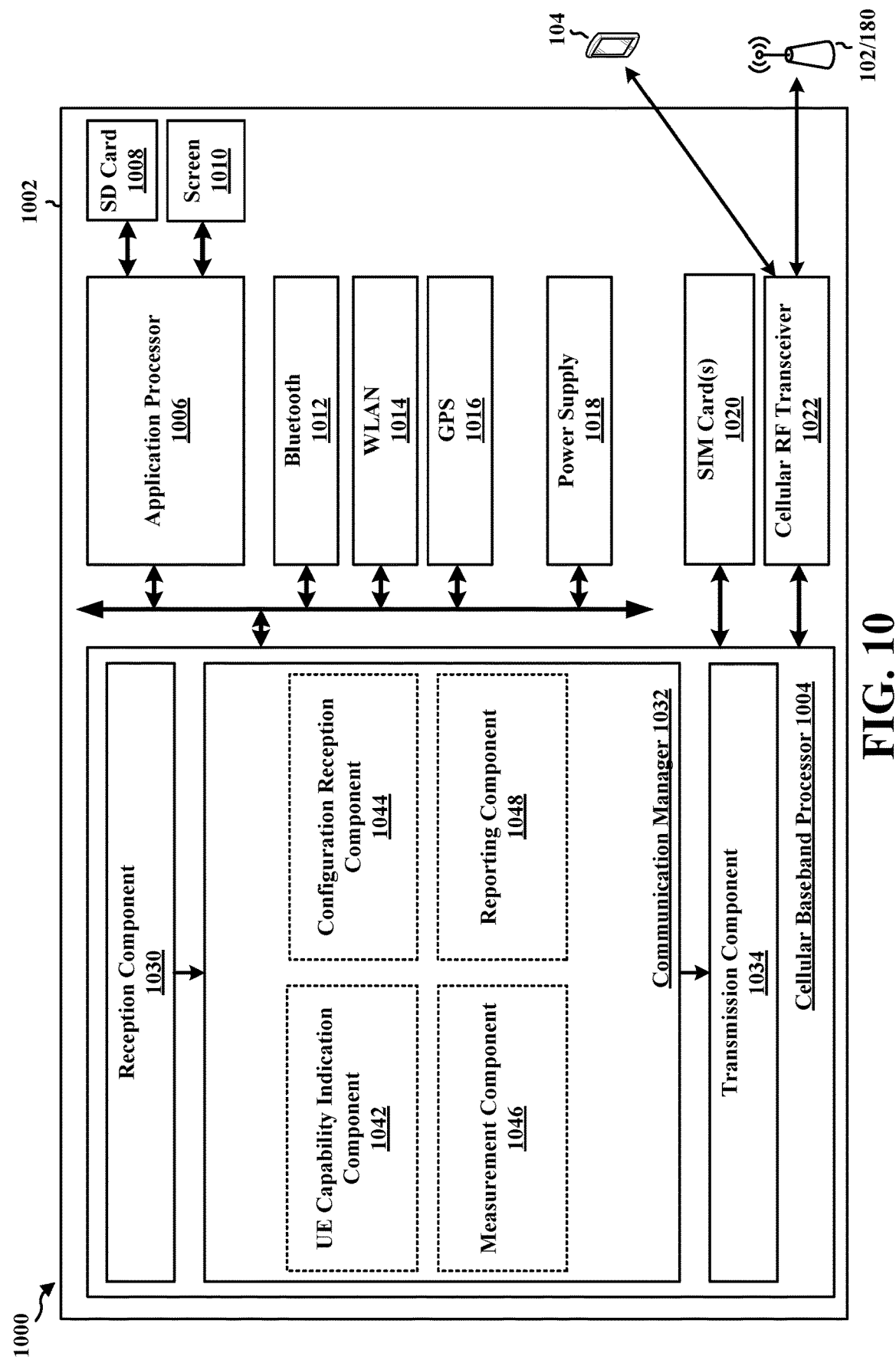
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In some aspects, the apparatus 1002 may be a modem chip and include just the baseband processor 1004, and in another configuration, the apparatus 1002 may be the entire UE (e.g., see 350 of FIG. 3) and include the afore discussed additional modules of the apparatus 1002.

The communication manager 1032 may include a UE capability indication component 1042 that is configured to transmit, to a base station, an indication indicating support for reporting one or more serving cell CSI-RS RRM measurements independent of non-serving cell CSI-RS RRM measurements, e.g., as described in connection with 602 in FIG. 6. The communication manager 1032 may further include a configuration reception component 1044 that is configured to receive, from the base station, a configuration of layer 3 measurement resources, e.g., as described in connection with 608 in FIG. 6. The communication manager 1032 may further include a measurement component 1046 that is configured to perform, based on the configuration of the layer 3 measurement resources, the one or more serving cell CSI-RS RRM measurements, e.g., as described in connection with 614 in FIG. 6. The communication manager 1032 may further include a reporting component 1048 that is configured to transmit, to the base station, the one or more serving cell CSI-RS RRM measurements for a serving cell, e.g., as described in connection with 626 in FIG. 6.

In some aspects, the UE capability indication component 1042 may be configured to transmit a UE capability indication indicating support for the serving cell report of the layer 3 measurement objects (such as part of an MDT report), e.g., as described in connection with 802 in FIG. 8. In some aspects, the configuration reception component 1044 may be configured to receive, from a base station, a configuration of layer 3 measurement objects for a serving cell, e.g., as described in connection with 804 in FIG. 8. In some aspects, the measurement component 1046 may be configured to perform, based on the configuration of the layer 3 measurement objects, one or more serving cell measurements of one or more layer 3 measurement reference signal resources for the serving cell, e.g., as described in connection with 812 in FIG. 8. In some aspects, the reporting component 1048 may be configured to transmit, to the base station, a serving cell report of the one or more serving cell measurement reference signal resources of the layer 3 measurement objects, e.g., as described in connection with 818 in FIG. 8.

The apparatus may include additional components that perform each of the blocks of the algorithm in the aforementioned flowcharts of FIG. 6 and FIG. 8. As such, each block in the aforementioned flowcharts of FIG. 6 and FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In some aspects, the apparatus 1002, and in particular the cellular baseband processor 1004, includes means for transmitting, to a base station, an indication indicating support for reporting one or more serving cell CSI-RS RRM measurements independent of non-serving cell CSI-RS RRM measurements. The cellular baseband processor 1004 may further include means for receiving, from the base station, a configuration of layer 3 measurement resources. The cellular baseband processor 1004 may further include means for performing, based on the configuration of the layer 3 measurement resources, the one or more serving cell CSI-RS RRM measurements. The cellular baseband processor 1004 may further include means for transmitting, to the base station, the one or more serving cell CSI-RS RRM measurements for a serving cell. The cellular baseband processor 1004 may further include means for refraining from indicating a CSI capability that supports measurements for the serving cell and for non-serving cells. The cellular baseband processor 1004 may further include means for removing, at a higher layer of the UE, the CSI-RS resources for the non-serving cell from the layer 3 measurement resources configured for the UE and providing remaining CSI-RS resources for the serving cell to a lower layer of the UE. The cellular baseband processor 1004 may further include means for performing the one or more serving cell CSI-RS RRM measurements for the serving cell and the non-serving cell. The cellular baseband processor 1004 may further include means for refraining from indicating a CSI capability that supports measurements for non-serving cells or for non-serving beams. The cellular baseband processor 1004 may further include means for determining that the one or more CSI-RS RRM resources are associated with the SSB and the cell ID associated with the serving beam. The cellular baseband processor 1004 may further include means for performing the one or more serving cell CSI-RS RRM measurements using the one or more CSI-RS RRM resources. The cellular baseband processor 1004 may further include means for pruning the one or more CSI-RS RRM resources associated with the non-serving beam based on one or more SSBs and the one or more CSI-RS RRM resources associated with the one or more non-serving cells based on one or more IDs. The cellular baseband processor 1004 may further include means for refraining from performing CSI-RS RRM measurements on the one or more non-serving cells and on the non-serving beam. The cellular baseband processor 1004 may further include means for performing the one or more serving cell CSI-RS RRM measurements for the serving cell, including the serving beam and the non-serving beam, and the one or more non-serving cells.

In some aspects, the apparatus 1002, and in particular the cellular baseband processor 1004, includes means for receiving, from a base station, a configuration of layer 3 measurement objects for a serving cell. The cellular baseband processor 1004 may further include means for performing, based on the configuration of the layer 3 measurement objects, one or more serving cell measurements of one or more layer 3 measurement reference signal resources for the serving cell. The cellular baseband processor 1004 may further include means for transmitting, to the base station, a serving cell report of the one or more serving cell measurement reference signal resources of the layer 3 measurement objects. The cellular baseband processor 1004 may further include means for refraining from performing layer 3 measurements for one or more non-serving cells. The cellular baseband processor 1004 may further include means for transmitting a UE capability indication indicating support for the serving cell report of the layer 3 measurement objects as part of an MDT report. The cellular baseband processor 1004 may further include means for decoding a PLMN ID of a network that supports the serving cell report of layer 3 measurements for the serving cell. The cellular baseband processor 1004 may further include means for refraining from performing the layer 3 measurements or from reporting the layer 3 measurements if the UE receives the configuration of layer 3 measurement objects for multiple cells. The cellular baseband processor 1004 may further include means for receiving, from the base station, UAI indicating the configuration. The cellular baseband processor 1004 may further include means for receiving, from the base station, RRC signaling indicating the configuration.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in some aspects, the aforementioned means may be the TX Processor 368, the RX Processor 356, and the controller/processor 359 configured to perform the functions recited by the aforementioned means.

Figure 11:
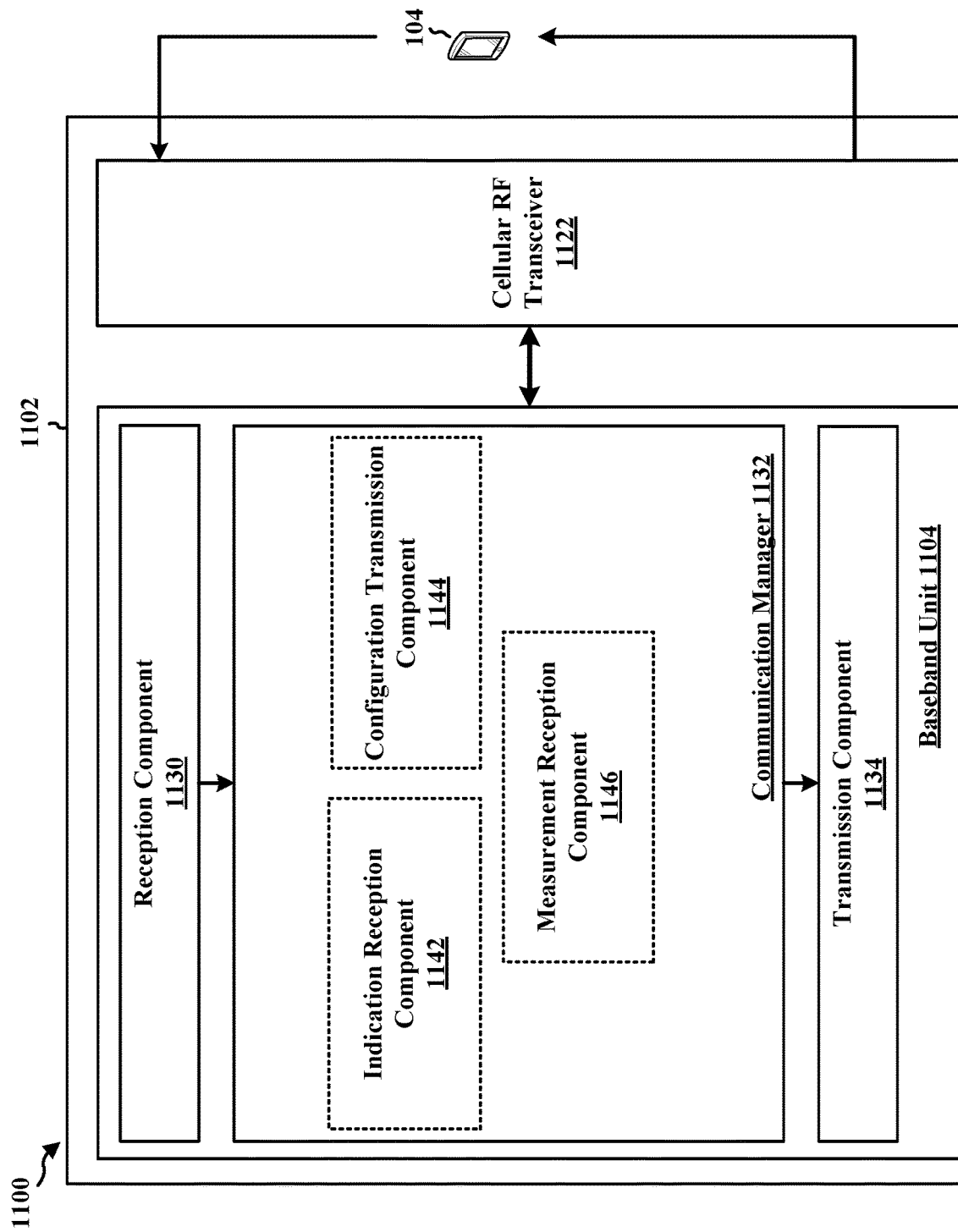
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes an indication reception component 1142 that receives, from a UE, an indication indicating support for reporting one or more serving cell CSI-RS RRM measurements independent of non-serving cell CSI-RS RRM measurements, e.g., as described in connection with 702 in FIG. 7. The communication manager 1132 further includes a configuration transmission component 1144 that responsive to receiving the indication, transmits, to the UE, a configuration of layer 3 measurement resources, e.g., as described in connection with 704 in FIG. 7 The communication manager 1132 further includes a measurement reception component 1146 that receives, from the UE, the one or more serving cell CSI-RS RRM measurements for a serving cell, e.g., as described in connection with 706 in FIG. 7.

In some aspects, the indication reception component 1142 that may receive a UE capability indication indicating support for the serving cell report of the layer 3 measurement objects as part of an MDT report, e.g., as described in connection with 902 in FIG. 9. In some aspects, the configuration transmission component 1144 may transmit, to a UE, a configuration of layer 3 measurement objects for a serving cell, e.g., as described in connection with 904 in FIG. 9 In some aspects, the measurement reception component 1146 may receive, from the UE, a serving cell report of one or more serving cell measurement reference signal resources of the layer 3 measurement objects, e.g., as described in connection with 910 in FIG. 9.

In some aspects, the apparatus 1102, and in particular the baseband unit 1104, includes means for transmitting, to a UE, a configuration of layer 3 measurement objects for a serving cell. The baseband unit 1104 may further include means for receiving, from the UE, a serving cell report of one or more serving cell measurement reference signal resources of the layer 3 measurement objects. The baseband unit 1104 may further include means for receiving a UE capability indication indicating support for the serving cell report of the layer 3 measurement objects as part of an MDT report. The baseband unit 1104 may further include means for transmitting, to the UE, UAI indicating the configuration. The baseband unit 1104 may further include means for transmitting, to the UE, RRC signaling indicating the configuration.

The apparatus may include additional components that perform each of the blocks of the algorithm in the aforementioned flowcharts of FIG. 7 and FIG. 9. As such, each block in the aforementioned flowcharts of FIG. 7 and FIG.

9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In some aspects, the apparatus 1102, and in particular the baseband unit 1104, includes means for receiving, from a UE, an indication indicating support for reporting one or more serving cell CSI-RS RRM measurements independent of non-serving cell CSI-RS RRM measurements. The baseband unit 1104 may further include means for responsive to receiving the indication, transmitting, to the UE, a configuration of layer 3 measurement resources. The baseband unit 1104 may further include means for receiving, from the UE, the one or more serving cell CSI-RS RRM measurements for a serving cell.

The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in some aspects, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, comprising: transmitting, to a base station, an indication indicating support for reporting one or more serving cell CSI-RS RRM measurements independent of non-serving cell CSI-RS RRM measurements; receiving, from the base station, a configuration of layer 3 measurement resources; performing, based on the configuration of the layer 3 measurement resources, the one or more serving cell CSI-RS RRM measurements; and transmitting, to the base station, the one or more serving cell CSI-RS RRM measurements for a serving cell.

Aspect 2 is the method of aspect 1, wherein the UE transmits, to the base station, the one or more serving cell CSI-RS RRM measurements of the serving cell and not of the non-serving cell.

Aspect 3 is the method of any of aspects 1 to 2, further comprising: refraining from indicating a CSI capability that supports measurements for the serving cell and for non-serving cells.

Aspect 4 is the method of any of aspects 1 to 3, wherein the indication is comprised in UE capability information associated with RRM or mobility.

Aspect 5 is the method of any of aspects 1 to 4, wherein the layer 3 measurement resources comprise one or more CSI-RS for the serving cell and not for a non-serving cell.

Aspect 6 is the method of any of aspects 1 to 5, wherein the layer 3 measurement resources comprise CSI-RS resources for the serving cell and a non-serving cell.

Aspect 7 is the method of any of aspects 1 to 6, further comprising: removing, at a higher layer of the UE, the CSI-RS resources for the non-serving cell from the layer 3 measurement resources configured for the UE and providing remaining CSI-RS resources for the serving cell to a lower layer of the UE.

Aspect 8 is the method of any of aspects 1 to 7, wherein the higher layer removes the CSI-RS resources for the non-serving cell based on a ID for the non-serving cell.

Aspect 9 is the method of any of aspects 1 to 6, further comprising: refraining from performing a CSI-RS RRM measurement on the non-serving cell.

Aspect 10 is the method of any of aspects 1 to 6, further comprising: performing the one or more serving cell CSI-RS RRM measurements for the serving cell and the non-serving cell, wherein the UE reports the one or more serving cell CSI-RS RRM measurements for the serving cell and not for the non-serving cell.

Aspect 11 is the method of any of aspects 1 to 10, wherein the one or more serving cell CSI-RS RRM measurements include one or more of: a SINR measurement, a RSRQ measurement, or a RSRP measurement.

Aspect 12 is the method of any of aspects 1 to 11, wherein the indication further indicates that the support is for a serving beam of the serving cell, the serving beam being associated with a SSB and a ID, wherein the UE transmits the one or more serving cell CSI-RS RRM measurements for the serving beam of the serving cell and not for a non-serving beam.

Aspect 13 is the method of any of aspects 1 to 12, further comprising: refraining from indicating a CSI capability that supports measurements for non-serving cells or for non-serving beams.

Aspect 14 is the method of any of aspects 1 to 12, wherein the configuration of the layer 3 measurement resources for the serving cell indicates one or more CSI-RS RRM resources associated with the SSB and the cell ID.

Aspect 15 is the method of any of aspects 1 to 14, wherein performing, based on the configuration of the layer 3 measurement resources, the one or more serving cell CSI-RS RRM measurements on the serving cell comprises: determining that the one or more CSI-RS RRM resources are associated with the SSB and the cell ID associated with the serving beam; and performing the one or more serving cell CSI-RS RRM measurements using the one or more CSI-RS RRM resources.

Aspect 16 is the method of any of aspects 1 to 15, wherein the configuration of the layer 3 measurement resources for the serving cell further indicates one or more CSI-RS RRM resources associated with one or more non-serving cells.

Aspect 17 is the method of any of aspects 1 to 16, further comprising: pruning the one or more CSI-RS RRM resources associated with the non-serving beam based on one or more SSBs and the one or more CSI-RS RRM resources associated with the one or more non-serving cells based on one or more cell IDs.

Aspect 18 is the method of any of aspects 1 to 16, further comprising: refraining from performing CSI-RS RRM measurements on the one or more non-serving cells and on the non-serving beam.

Aspect 19 is the method of any of aspects 1 to 16, further comprising: performing the one or more serving cell CSI-RS RRM measurements for the serving cell, including the serving beam and the non-serving beam, and the one or more non-serving cells, wherein the UE transmits the one or more serving cell CSI-RS RRM measurements for the serving beam of the serving cell and does not report the one or more serving cell CSI-RS RRM measurements for the one or more non-serving cells and the non-serving beam.

Aspect 20 is an apparatus for wireless communication at a UE, comprising: a memory; and at least one processor coupled to the memory and configured to: transmit, to a base station, an indication indicating support for reporting one or more serving cell CSI-RS RRM measurements independent of non-serving cell CSI-RS RRM measurements; receive, from the base station, a configuration of layer 3 measurement resources; perform, based on the configuration of the layer 3 measurement resources, the one or more serving cell CSI-RS RRM measurements; and transmit, to the base station, the one or more serving cell CSI-RS RRM measurements for a serving cell.

Aspect 21 is the apparatus for wireless communication of aspect 20, wherein the at least one processor is configured to perform the method of any of aspects 2-19.

Aspect 22 is an apparatus for wireless communication at a UE, comprising: means for transmitting, to a base station, an indication indicating support for reporting one or more serving cell CSI-RS RRM measurements independent of non-serving cell CSI-RS RRM measurements; means for receiving, from the base station, a configuration of layer 3 measurement resources; means for performing, based on the configuration of the layer 3 measurement resources, the one or more serving cell CSI-RS RRM measurements; and means for transmitting, to the base station, the one or more serving cell CSI-RS RRM measurements for a serving cell.

Aspect 23 is the apparatus for wireless communication of aspect 22, further comprising means to perform the method of any of aspects 2-10.

Aspect 24 is a computer-readable medium storing computer executable code at a UE, the code when executed by a processor causes the processor to: transmit, to a base station, an indication indicating support for reporting one or more serving cell CSI-RS RRM measurements independent of non-serving cell CSI-RS RRM measurements; receive, from the base station, a configuration of layer 3 measurement resources; perform, based on the configuration of the layer 3 measurement resources, the one or more serving cell CSI-RS RRM measurements; and transmit, to the base station, the one or more serving cell CSI-RS RRM measurements for a serving cell.

Aspect 25 is the computer-readable medium of aspect 24, wherein the code when executed by the processor causes the processor to perform the method of any of aspects 2-19.

Aspect 26 is a method of wireless communication at a base station, comprising: receiving, from a UE, an indication indicating support for reporting one or more serving cell CSI-RS RRM measurements independent of non-serving cell CSI-RS RRM measurements; responsive to receiving the indication, transmitting, to the UE, a configuration of layer 3 measurement resources; and receiving, from the UE, the one or more serving cell CSI-RS RRM measurements for a serving cell.

Aspect 27 is the method of aspect 26, wherein the base station receives, from the UE, the one or more serving cell CSI-RS RRM measurements of the serving cell and not of the non-serving cell.

Aspect 28 is the method of any of aspects 26 to 27, wherein the indication is comprised in UE capability information associated with RRM or mobility.

Aspect 29 is the method of any of aspects 26 to 28, wherein the layer 3 measurement resources comprise one or more CSI-RS for the serving cell and not for a non-serving cell.

Aspect 30 is the method of any of aspects 26 to 29, wherein the layer 3 measurement resources comprise CSI-RS resources for the serving cell and a non-serving cell.

Aspect 31 is the method of any of aspects 26 to 30, wherein the one or more serving cell CSI-RS RRM measurements include one or more of: a SINR measurement, a RSRQ measurement, or a RSRP measurement.

Aspect 32 is the method of any of aspects 26 to 31, wherein the indication further indicates that the support is for a serving beam of the serving cell, the serving beam being associated with a SSB and a ID, wherein the base station receives the one or more serving cell CSI-RS RRM measurements for the serving beam of the serving cell and not for a non-serving beam.

Aspect 33 is the method of any of aspects 26 to 32, wherein the configuration of the layer 3 measurement resources for the serving cell indicates one or more CSI-RS RRM resources associated with the SSB and the cell ID.

Aspect 34 is an apparatus for wireless communication at a base station, comprising: a memory; and at least one processor coupled to the memory and configured to: receive, from a UE, an indication indicating support for reporting one or more serving cell CSI-RS RRM measurements independent of non-serving cell CSI-RS RRM measurements; responsive to receiving the indication, transmit, to the UE, a configuration of layer 3 measurement resources; and receive, from the UE, the one or more serving cell CSI-RS RRM measurements for a serving cell.

Aspect 35 is the apparatus for wireless communication of aspect 34, wherein the at least one processor is configured to perform the method of any of aspects 26-33.

Aspect 36 is an apparatus for wireless communication at a base station, comprising: means for receiving, from a UE, an indication indicating support for reporting one or more serving cell CSI-RS RRM measurements independent of non-serving cell CSI-RS RRM measurements; means for responsive to receiving the indication, transmitting, to the UE, a configuration of layer 3 measurement resources; and means for receiving, from the UE, the one or more serving cell CSI-RS RRM measurements for a serving cell.

Aspect 37 is the apparatus for wireless communication of aspect 36, further comprising means to perform the method of any of aspects 26-33.

Aspect 38 is a computer-readable medium storing computer executable code at a base station, the code when executed by a processor causes the processor to: receive, from a UE, an indication indicating support for reporting one or more serving cell CSI-RS RRM measurements independent of non-serving cell CSI-RS RRM measurements; responsive to receiving the indication, transmit, to the UE, a configuration of layer 3 measurement resources; and receive, from the UE, the one or more serving cell CSI-RS RRM measurements for a serving cell.

Aspect 39 is the computer-readable medium of aspect 38, wherein the code when executed by the processor causes the processor to perform the method of any of aspects 26-33.

Aspect 40 is a method of wireless communication at a UE, comprising: receiving, from a base station, a configuration of layer 3 measurement objects for a serving cell; performing, based on the configuration of the layer 3 measurement objects, one or more serving cell measurements of one or more layer 3 measurement reference signal resources for the serving cell; and transmitting, to the base station, a serving cell report of the one or more serving cell measurement reference signal resources of the layer 3 measurement objects.

Aspect 41 is the method of aspect 40, wherein the serving cell report reports the one or more serving cell measurement reference signal resources of the layer 3 measurement objects without reporting non-serving cell measurements.

Aspect 42 is the method of any of aspects 40 to 41, wherein the layer 3 measurement objects comprise resources based on one or more SSBs for the serving cell.

Aspect 43 is the method of any of aspects 40 to 42, wherein the layer 3 measurement objects comprise resources based on one or more CSI-RS for the serving cell.

Aspect 44 is the method of any of aspects 40 to 43, further comprising: refraining from performing layer 3 measurements for one or more non-serving cells.

Aspect 45 is the method of any of aspects 40 to 44, wherein the serving cell report comprises an MDT report of the one or more serving cell measurements of the layer 3 measurement objects.

Aspect 46 is the method of any of aspects 40 to 45, wherein the MDT report is an immediate MDT report.

Aspect 47 is the method of any of aspects 40 to 45, wherein the MDT report is a logged MDT report.

Aspect 48 is the method of any of aspects any of aspects 40 to 47, wherein the serving cell report comprises a measurement report of RRM measurements for mobility management.

Aspect 49 is the method of any of aspects any of aspects 40 to 48, wherein the one or more serving cell measurements include one or more of: a SINR measurement, a RSRQ measurement, or a RSRP measurement.

Aspect 50 is the method of any of aspects any of aspects 40 to 49, further comprising: transmitting a UE capability indication indicating support for the serving cell report of the layer 3 measurement objects as part of an MDT report.

Aspect 51 is the method of any of aspects any of aspects 40 to 50, wherein the UE capability indication further indicates support for the serving cell report without reporting layer 3 measurements for non-serving cells.

Aspect 52 is the method of any of aspects any of aspects 40 to 51, wherein the UE capability indication is comprised in a capability field for the serving cell report.

Aspect 53 is the method of any of aspects any of aspects 40 to 52, wherein the UE capability indication further indicates support for a serving cell report for layer 3 measurements of a serving beam of the serving cell.

Aspect 54 is the method of any of aspects any of aspects 40 to 53, wherein performing, based on the configuration of layer 3 measurement objects, the one or more serving cell measurements comprises performing the one or more serving cell measurements on the serving beam and not on a non-serving beam.

Aspect 55 is the method of any of aspects any of aspects 40 to 54, wherein the UE capability indication is comprised in one or more unused bit of a capability field for the same or a different capability than the serving cell report of layer 3 measurements for the serving cell.

Aspect 56 is the method of any of aspects any of aspects 40 to 55, further comprising: prior to the performing, decoding a PLMN ID of a network that supports the serving cell report of layer 3 measurements for the serving cell.

Aspect 57 is the method of any of aspects any of aspects 40 to 56, wherein the configuration includes the layer 3 measurement objects for the serving cell.

Aspect 58 is the method of any of aspects any of aspects 40 to 57, wherein the UE transmits the serving cell report of the one or more serving cell measurements of the layer 3 measurement objects in response to receiving the configuration of the layer 3 measurement objects for the serving cell.

Aspect 59 is the method of any of aspects any of aspects 40 to 58, wherein the configuration of the layer 3 measurement objects is for the serving cell and one or more non-serving cells.

Aspect 60 is the method of any of aspects any of aspects 40 to 59, further comprising: refraining from performing the layer 3 measurements or from reporting the layer 3 measurements if the UE receives the configuration of layer 3 measurement objects for multiple cells.

Aspect 61 is the method of any of aspects any of aspects 40 to 60, further comprising: receiving, from the base station, UAI indicating the configuration.

Aspect 62 is the method of any of aspects any of aspects 40 to 61, further comprising: receiving, from the base station, RRC signaling indicating the configuration.

Aspect 63 is an apparatus for wireless communication at a UE, comprising: a memory; and at least one processor coupled to the memory and configured to: receive, from a base station, a configuration of layer 3 measurement objects for a serving cell; perform, based on the configuration of the layer 3 measurement objects, one or more serving cell measurements of one or more layer 3 measurement reference signal resources for the serving cell; and transmit, to the base station, a serving cell report of the one or more serving cell measurement reference signal resources of the layer 3 measurement objects.

Aspect 64 is the apparatus for wireless communication of aspect 63, wherein the at least one processor is configured to perform the method of any of aspects 41-62.

Aspect 65 is an apparatus for wireless communication at a UE, comprising: means for receiving, from a base station, a configuration of layer 3 measurement objects for a serving cell; means for performing, based on the configuration of the layer 3 measurement objects, one or more serving cell measurements of one or more layer 3 measurement reference signal resources for the serving cell; and means for transmitting, to the base station, a serving cell report of the one or more serving cell measurement reference signal resources of the layer 3 measurement objects.

Aspect 66 is the apparatus for wireless communication of aspect 65, further comprising means to perform the method of any of aspects 41-62.

Aspect 67 is a computer-readable medium storing computer executable code at a UE, the code when executed by a processor causes the processor to: receive, from a base station, a configuration of layer 3 measurement objects for a serving cell; perform, based on the configuration of the layer 3 measurement objects, one or more serving cell measurements of one or more layer 3 measurement reference signal resources for the serving cell; and transmit, to the base station, a serving cell report of the one or more serving cell measurement reference signal resources of the layer 3 measurement objects.

Aspect 68 is the computer-readable medium of aspect 67, wherein the code when executed by the processor causes the processor to perform the method of any of aspects 41-62.

Aspect 69 is a method of wireless communication at a base station, comprising: transmitting, to a UE, a configuration of layer 3 measurement objects for a serving cell; and receiving, from the UE, a serving cell report of one or more serving cell measurement reference signal resources of the layer 3 measurement objects.

Aspect 70 is the method of aspect 69, wherein the serving cell report reports the one or more serving cell measurement reference signal resources of the layer 3 measurement objects without reporting non-serving cell measurements.

Aspect 71 is the method of any of aspects 69 to 70, wherein the layer 3 measurement objects comprise resources based on one or more SSBs for the serving cell.

Aspect 72 is the method of any of aspects 69 to 71, wherein the layer 3 measurement objects comprise resources based on one or more CSI-RS for the serving cell.

Aspect 73 is the method of any of aspects 69 to 72, wherein the serving cell report comprises an MDT report of the one or more serving cell measurements of the layer 3 measurement objects.

Aspect 74 is the method of any of aspects 69 to 72, wherein the MDT report is an immediate MDT report.

Aspect 75 is the method any of aspects 69 to 74, wherein the MDT report is a logged MDT report.

Aspect 76 is the method of any of aspects 69 to 75, wherein the serving cell report comprises a measurement report of RRM measurements for mobility management.

Aspect 77 is the method of any of aspects 69 to 76, wherein the one or more serving cell measurements include one or more of: a SINR measurement, a RSRQ measurement, or a RSRP measurement.

Aspect 78 is the method of any of aspects 69 to 77, further comprising: receiving a UE capability indication indicating support for the serving cell report of the layer 3 measurement objects as part of an MDT report.

Aspect 79 is the method of any of aspects 69 to 78, wherein the UE capability indication further indicates support for the serving cell report without reporting layer 3 measurements for non-serving cells.

Aspect 80 is the method of any of aspects 69 to 79, wherein the UE capability indication is comprised in a capability field for the serving cell report.

Aspect 81 is the method of any of aspects 69 to 80, wherein the UE capability indication further indicates support for a serving cell report for layer 3 measurements of a serving beam of the serving cell.

Aspect 82 is the method of any of aspects 69 to 81, wherein the UE capability indication is comprised in one or more unused bit of a capability field for the same or a different capability than the serving cell report of layer 3 measurements for the serving cell.

Aspect 83 is the method of any of aspects 69 to 82, wherein the configuration includes the layer 3 measurement objects for the serving cell.

Aspect 84 is the method of any of aspects 69 to 83, wherein the configuration of the layer 3 measurement objects is for the serving cell and one or more non-serving cells.

Aspect 85 is the method of aspects 69 to 84, further comprising: transmitting, to the UE, UAI indicating the configuration.

Aspect 86 is the method of aspects 69 to 85, further comprising: transmitting, to the UE, RRC signaling indicating the configuration.

Aspect 87 is an apparatus for wireless communication at a base station, comprising: a memory; and at least one processor coupled to the memory and configured to: transmit, to a UE, a configuration of layer 3 measurement objects for a serving cell; and receive, from the UE, a serving cell report of one or more serving cell measurement reference signal resources of the layer 3 measurement objects.

Aspect 88 is the apparatus for wireless communication of aspect 87, wherein the at least one processor is configured to perform the method of any of aspects 69-86.

Aspect 89 is an apparatus for wireless communication at a base station, comprising: means for transmitting, to a UE, a configuration of layer 3 measurement objects for a serving cell; and means for receiving, from the UE, a serving cell report of one or more serving cell measurement reference signal resources of the layer 3 measurement objects.

Aspect 90 is the apparatus for wireless communication of aspect 89, further comprising means to perform the method of any of aspects 69-86.

Aspect 91 is a computer-readable medium storing computer executable code at a base station, the code when executed by a processor causes the processor to: transmit, to a UE, a configuration of layer 3 measurement objects for a serving cell; and receive, from the UE, a serving cell report of one or more serving cell measurement reference signal resources of the layer 3 measurement objects.

Aspect 92 is the computer-readable medium of aspect 91, wherein the code when executed by the processor causes the processor to perform the method of any of aspects 69-86.

What is claimed is:
1. An apparatus for wireless communication at a user equipment (UE), comprising:

a memory; and
at least one processor coupled to the memory and configured to:
transmit, to a base station, an indication indicating support for reporting one or more serving cell channel state information reference signal (CSI-RS) radio resource management (RRM) measurements without indicating support of non-serving cell CSI-RS RRM measurements;
receive, from the base station, a configuration of layer 3 measurement resources;
perform, based on the configuration of the layer 3 measurement resources, the one or more serving cell CSI-RS RRM measurements; and
transmit, to the base station, the one or more serving cell CSI-RS RRM measurements for a serving cell.

2. The apparatus of claim 1, wherein the UE transmits, to the base station, the one or more serving cell CSI-RS RRM measurements of the serving cell and not of a non-serving cell.

3. The apparatus of claim 1, wherein the at least one processor is further configured to:
refrain from indicating a channel state information (CSI) capability that supports measurements for the serving cell and for non-serving cells.

4. The apparatus of claim 1, wherein the indication is comprised in UE capability information associated with radio resource management (RRM) or mobility.

5. The apparatus of claim 1, wherein the layer 3 measurement resources comprise one or more CSI-RS for the serving cell and not for a non-serving cell.

6. The apparatus of claim 1, wherein the layer 3 measurement resources comprise CSI-RS resources for the serving cell and a non-serving cell.

7. The apparatus of claim 6, wherein the at least one processor is further configured to:
remove, at a higher layer of the UE, the CSI-RS resources for the non-serving cell from the layer 3 measurement resources configured for the UE and providing remaining CSI-RS resources for the serving cell to a lower layer of the UE, wherein the higher layer removes the CSI-RS resources for the non-serving cell based on a cell identifier (ID) for the non-serving cell.

8. The apparatus of claim 6, wherein the at least one processor is further configured to:
refrain from performing a CSI-RS RRM measurement on the non-serving cell.

9. The apparatus of claim 6, wherein the at least one processor is further configured to:
perform the one or more serving cell CSI-RS RRM measurements for the serving cell and the non-serving cell, wherein the UE reports the one or more serving cell CSI-RS RRM measurements for the serving cell and not for the non-serving cell.

10. The apparatus of claim 1, wherein the one or more serving cell CSI-RS RRM measurements include one or more of: a signal to noise ratio (SINR) measurement, a reference signal received quality (RSRQ) measurement, or a reference signal received power (RSRP) measurement.

11. The apparatus of claim 1, wherein the indication further indicates that the support is for a serving beam of the serving cell, the serving beam being associated with a synchronization signal block (SSB) and a cell identifier (ID), wherein the UE transmits the one or more serving cell CSI-RS RRM measurements for the serving beam of the serving cell and not for a non-serving beam; and wherein the at least one processor is further configured to:
refrain from indicating a channel state information (CSI) capability that supports measurements for non-serving cells or for non-serving beams.

12. The apparatus of claim 11, wherein the configuration of the layer 3 measurement resources for the serving cell indicates one or more CSI-RS RRM resources associated with the SSB and the cell ID.

13. The apparatus of claim 11, wherein the configuration of the layer 3 measurement resources for the serving cell further indicates one or more CSI-RS RRM resources associated with one or more non-serving cells.

14. The apparatus of claim 11, further including a transceiver coupled to the at least one processor, and wherein the at least one processor is further configured to:
prune the one or more CSI-RS RRM resources associated with the non-serving beam based on one or more synchronization signal blocks (SSBs) and the one or more CSI-RS RRM resources associated with the one or more non-serving cells based on one or more cell identifiers (IDs).

15. A method of wireless communication at a user equipment (UE), comprising:
transmitting, to a base station, an indication indicating support for reporting one or more serving cell channel state information reference signal (CSI-RS) radio resource management (RRM) measurements without indicating support of non-serving cell CSI-RS RRM measurements;
receiving, from the base station, a configuration of layer 3 measurement resources;
performing, based on the configuration of the layer 3 measurement resources, the one or more serving cell CSI-RS RRM measurements; and
transmitting, to the base station, the one or more serving cell CSI-RS RRM measurements for a serving cell.

16. The method of claim 15, wherein the UE transmits, to the base station, the one or more serving cell CSI-RS RRM measurements of the serving cell and not of a non-serving cell.

17. The method of claim 15, further comprising:
refraining from indicating a channel state information (CSI) capability that supports measurements for the serving cell and for non-serving cells.

18. The method of claim 15, wherein the indication is comprised in UE capability information associated with radio resource management (RRM) or mobility.

19. The method of claim 15, wherein the layer 3 measurement resources comprise one or more CSI-RS for the serving cell and not for a non-serving cell.

20. The method of claim 15, wherein the layer 3 measurement resources comprise CSI-RS resources for the serving cell and a non-serving cell.

21. The method of claim 20, further comprising:
removing, at a higher layer of the UE, the CSI-RS resources for the non-serving cell from the layer 3 measurement resources configured for the UE and providing remaining CSI-RS resources for the serving cell to a lower layer of the UE, wherein the higher layer removes the CSI-RS resources for the non-serving cell based on a cell identifier (ID) for the non-serving cell.

22. The method of claim 20, further comprising:
refraining from performing a CSI-RS RRM measurement on the non-serving cell.

23. The method of claim 20, further comprising:
performing the one or more serving cell CSI-RS RRM measurements for the serving cell and the non-serving cell, wherein the UE reports the one or more serving cell CSI-RS RRM measurements for the serving cell and not for the non-serving cell.

24. The method of claim 15, wherein the one or more serving cell CSI-RS RRM measurements include one or more of: a signal to noise ratio (SINR) measurement, a reference signal received quality (RSRQ) measurement, or a reference signal received power (RSRP) measurement.

25. The method of claim 15, wherein the indication further indicates that the support is for a serving beam of the serving cell, the serving beam being associated with a synchronization signal block (SSB) and a cell identifier (ID), wherein the UE transmits the one or more serving cell CSI-RS RRM measurements for the serving beam of the serving cell and not for a non-serving beam.

26. The method of claim 25, further comprising:
refraining from indicating a channel state information (CSI) capability that supports measurements for non-serving cells or for non-serving beams.

27. The method of claim 25, wherein the configuration of the layer 3 measurement resources for the serving cell further indicates one or more CSI-RS RRM resources associated with one or more non-serving cells.

28. The method of claim 27, further comprising:
pruning the one or more CSI-RS RRM resources associated with the non-serving beam based on one or more synchronization signal blocks (SSBs) and the one or more CSI-RS RRM resources associated with the one or more non-serving cells based on one or more cell identifiers (IDs).

29. An apparatus for wireless communication at a base station, comprising:
a memory; and
at least one processor coupled to the memory and configured to:
receive, from a user equipment (UE), an indication indicating support for reporting one or more serving cell channel state information reference signal (CSI-RS) radio resource management (RRM) measurements without indicating support of non-serving cell CSI-RS RRM measurements;
responsive to receiving the indication, transmit, to the UE, a configuration of layer 3 measurement resources; and
receive, from the UE, the one or more serving cell CSI-RS RRM measurements for a serving cell.

30. A method of wireless communication at a base station, comprising:
receiving, from a user equipment (UE), an indication indicating support for reporting one or more serving cell channel state information reference signal (CSI-RS) radio resource management (RRM) measurements without indicating support of non-serving cell CSI-RS RRM measurements;
responsive to receiving the indication, transmitting, to the UE, a configuration of layer 3 measurement resources; and
receiving, from the UE, the one or more serving cell CSI-RS RRM measurements for a serving cell.

* * * * *